(12) United States Patent
McFarland, Jr.

(10) Patent No.: US 11,107,355 B2
(45) Date of Patent: Aug. 31, 2021

(54) TRANSPORT DANGEROUS DRIVING REPORTING

(71) Applicant: TOYOTA MOTOR NORTH AMERICA, INC., Plano, TX (US)

(72) Inventor: Stephen Paul McFarland, Jr., Allen, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 8 days.

(21) Appl. No.: 16/705,217

(22) Filed: Dec. 5, 2019

(65) Prior Publication Data
US 2021/0174684 A1   Jun. 10, 2021

(51) Int. Cl.
| | |
|---|---|
| *G08G 1/16* | (2006.01) |
| *G07C 5/00* | (2006.01) |
| *G06K 9/00* | (2006.01) |
| *H04W 4/021* | (2018.01) |
| *H04W 4/44* | (2018.01) |
| *G06Q 40/08* | (2012.01) |

(52) U.S. Cl.
CPC ......... *G08G 1/164* (2013.01); *G06K 9/00758* (2013.01); *G06Q 40/08* (2013.01); *G07C 5/008* (2013.01); *H04W 4/021* (2013.01); *H04W 4/44* (2018.02)

(58) Field of Classification Search
CPC ....... G08G 1/164; G08G 1/166; H04W 4/021; H04W 4/44; G06Q 40/08; G07C 5/008; G06K 9/00758; G05D 1/0088; G05D 2201/0213; H04L 67/12
See application file for complete search history.

(56) References Cited

U.S. PATENT DOCUMENTS

| | | |
|---|---|---|
| 5,979,586 A | 11/1999 | Farmer et al. |
| 6,925,425 B2 | 8/2005 | Remboski et al. |
| 7,190,260 B2 | 3/2007 | Rast |
| 7,348,895 B2 | 3/2008 | Lagassey |
| 7,359,821 B1 | 4/2008 | Smith et al. |
| 7,725,334 B2 | 5/2010 | Wahlbin et al. |
| 7,890,352 B2 | 2/2011 | Wahlbin et al. |
| 9,317,983 B2 | 4/2016 | Ricci |
| 9,371,099 B2 | 6/2016 | Lagassey |
| 9,390,625 B2 | 7/2016 | Green et al. |
| 9,457,754 B1 | 10/2016 | Christensen et al. |
| 9,472,104 B2 | 10/2016 | Hyde et al. |

(Continued)

FOREIGN PATENT DOCUMENTS

| | | |
|---|---|---|
| CN | 100481149 C | 4/2009 |
| CN | 101751785 A | 6/2010 |

(Continued)

OTHER PUBLICATIONS

McFarland, U.S. Appl. No. 16/705,211, filed Dec. 5, 2019, "Impact Media Sharing".

(Continued)

*Primary Examiner* — Orlando Bousono

(57) ABSTRACT

An example operation includes one or more of identifying a dangerous driving situation, capturing first media by a vehicle involved in the dangerous driving situation, establishing a geofence based on a distance associated with the dangerous driving situation, and capturing second media by one or more other vehicles within the geofence.

14 Claims, 22 Drawing Sheets

(56) References Cited

U.S. PATENT DOCUMENTS

| | | | |
|---|---|---|---|
| 9,558,667 | B2 | 1/2017 | Bowers et al. |
| 9,679,487 | B1 | 6/2017 | Hayward |
| 9,697,015 | B2 | 7/2017 | Preston |
| 9,721,302 | B2 | 8/2017 | Tofte et al. |
| 9,818,239 | B2 | 11/2017 | Pal et al. |
| 9,866,673 | B2 | 1/2018 | Gabel |
| 9,946,262 | B2 | 4/2018 | Ansari |
| 9,994,218 | B2 | 6/2018 | Pal et al. |
| 10,145,684 | B1 | 12/2018 | Tofte et al. |
| 10,347,111 | B1 | 7/2019 | Hollenstain et al. |
| 10,380,694 | B1 | 8/2019 | Grant et al. |
| 10,387,962 | B1 | 8/2019 | Potter et al. |
| 10,403,140 | B2 | 9/2019 | Banvait et al. |
| 10,789,493 | B1 * | 9/2020 | Rocci .................... H04W 4/46 |
| 2002/0186146 | A1 | 12/2002 | Mikhaylenko et al. |
| 2005/0275522 | A1 | 12/2005 | Nitz et al. |
| 2010/0123779 | A1 | 5/2010 | Snyder et al. |
| 2011/0018998 | A1 | 1/2011 | Guzik |
| 2012/0242511 | A1 | 9/2012 | Morgan et al. |
| 2013/0155237 | A1 | 6/2013 | Paek et al. |
| 2014/0300739 | A1 | 10/2014 | Mimar |
| 2015/0061895 | A1 * | 3/2015 | Ricci .................... G06Q 10/20 340/902 |
| 2015/0149218 | A1 | 5/2015 | Bayley et al. |
| 2015/0248836 | A1 | 9/2015 | Alselimi |
| 2015/0356793 | A1 | 12/2015 | Dietz et al. |
| 2016/0040998 | A1 * | 2/2016 | Ricci .................... B60W 50/085 701/431 |
| 2016/0152211 | A1 | 6/2016 | Owens et al. |
| 2016/0189442 | A1 | 6/2016 | Wright |
| 2016/0275790 | A1 | 9/2016 | Kang et al. |
| 2016/0362117 | A1 | 12/2016 | Kaufmann et al. |
| 2017/0025000 | A1 | 1/2017 | Lagassey |
| 2017/0078223 | A1 * | 3/2017 | Ricci .................... G01C 21/3484 |
| 2017/0228948 | A1 | 8/2017 | Albitz et al. |
| 2017/0300503 | A1 | 10/2017 | Wang et al. |
| 2018/0094969 | A1 | 4/2018 | Kim |
| 2018/0215344 | A1 | 8/2018 | Santora et al. |
| 2018/0225974 | A1 * | 8/2018 | Molin .................... G06Q 10/06 |
| 2018/0288586 | A1 | 10/2018 | Tran et al. |
| 2019/0193659 | A1 | 6/2019 | Miyazawa et al. |
| 2019/0217868 | A1 | 7/2019 | Kim et al. |
| 2019/0244301 | A1 | 8/2019 | Seth et al. |
| 2019/0295409 | A1 | 9/2019 | Akahane |
| 2020/0134933 | A1 * | 4/2020 | Covington .............. G07C 5/008 |

FOREIGN PATENT DOCUMENTS

| | | |
|---|---|---|
| CN | 102866803 A | 1/2013 |
| CN | 103770736 A | 5/2014 |
| CN | 106406514 A | 2/2017 |
| CN | 107851395 A | 3/2018 |
| CN | 108248406 A | 7/2018 |
| CN | 109895788 A | 6/2019 |
| CN | 110045825 A | 7/2019 |
| DE | 102016219795 A1 | 4/2018 |
| DE | 102017216000 A1 | 3/2019 |
| EP | 1326759 B1 | 11/2006 |
| GB | 2486384 A | 6/2012 |
| JP | 3643648 B2 | 4/2005 |
| JP | 2006199204 A | 8/2006 |
| JP | 4046592 B2 | 2/2008 |
| KR | 20080023483 A | 3/2008 |
| KR | 20080006500 U | 12/2008 |
| KR | 101283965 B1 | 7/2013 |
| RU | 2625522 C2 | 7/2017 |
| WO | 2017139229 A1 | 8/2017 |

OTHER PUBLICATIONS

McFarland, U.S. Appl. No. 16/705,212, filed Dec. 5, 2019, "Transport Impact Reporting on Sound Levels".

McFarland, U.S. Appl. No. 16/705,218, filed Dec. 5, 2019, "Transport Sound Profile".

Notice of Allowance dated Aug. 19, 2020 that issued in the parent U.S. Appl. No. 16/705,211.

\* cited by examiner

TRANSPORT DANGEROUS DRIVING REPORTING

TECHNICAL FIELD

This application generally relates to capturing media related to a vehicle involved in a dangerous driving situation, and more particularly, to a transport dangerous driving reporting.

BACKGROUND

Transports, such as cars, motorcycles, trucks, planes, trains, etc., generally provide transportation needs to occupants and/or goods in a variety of ways. Functions related to transports may be identified and utilized by various computing devices, such as a smartphone or a computer.

Although collisions involving transports are important and deserve significant attention, dangerous driving situations that may or may not involve a collision get significantly less attention, if any attention at all. What is needed is a way to rapidly gather and disseminate rich media information in order to prevent an impact or accident, or assist a driver in need. The present application discloses capturing media by a transport involved in a dangerous driving situation. A geofence is established within a distance of the dangerous driving situation, and additional media is captured from other transports within the geofence boundaries. This provides multiple data sources in order to understand and resolve dangerous driving situations. This understanding may then be used to correct environmental and/or structural problems (e.g. poor visibility, lighting, signage, plants/trees, road design, etc.) that may lead to an accident.

SUMMARY

One example embodiment provides a method that includes one or more of identifying a dangerous driving situation, capturing first media by a vehicle involved in the dangerous driving situation, establishing a geofence based on a distance associated with the dangerous driving situation, and capturing second media by one or more other vehicles within the geofence.

Another example embodiment provides a vehicle that includes a processor and a memory, coupled to the processor. The memory includes instructions that when executed by the processor are configured to perform one or more of identify a dangerous driving situation, capture first media by a vehicle involved in the dangerous driving situation, establish a geofence based on a distance associated with the dangerous driving situation, and receive second media from one or more other vehicles within the geofence.

A further example embodiment provides a non-transitory computer readable medium comprising instructions, that when read by a processor, cause the processor to perform one or more of identifying a dangerous driving situation, capturing first media by a vehicle involved in the dangerous driving situation, establishing a geofence based on a distance associated with the dangerous driving situation, and capturing second media by one or more other vehicles within the geofence.

DETAILED DESCRIPTION

Figure 1A:
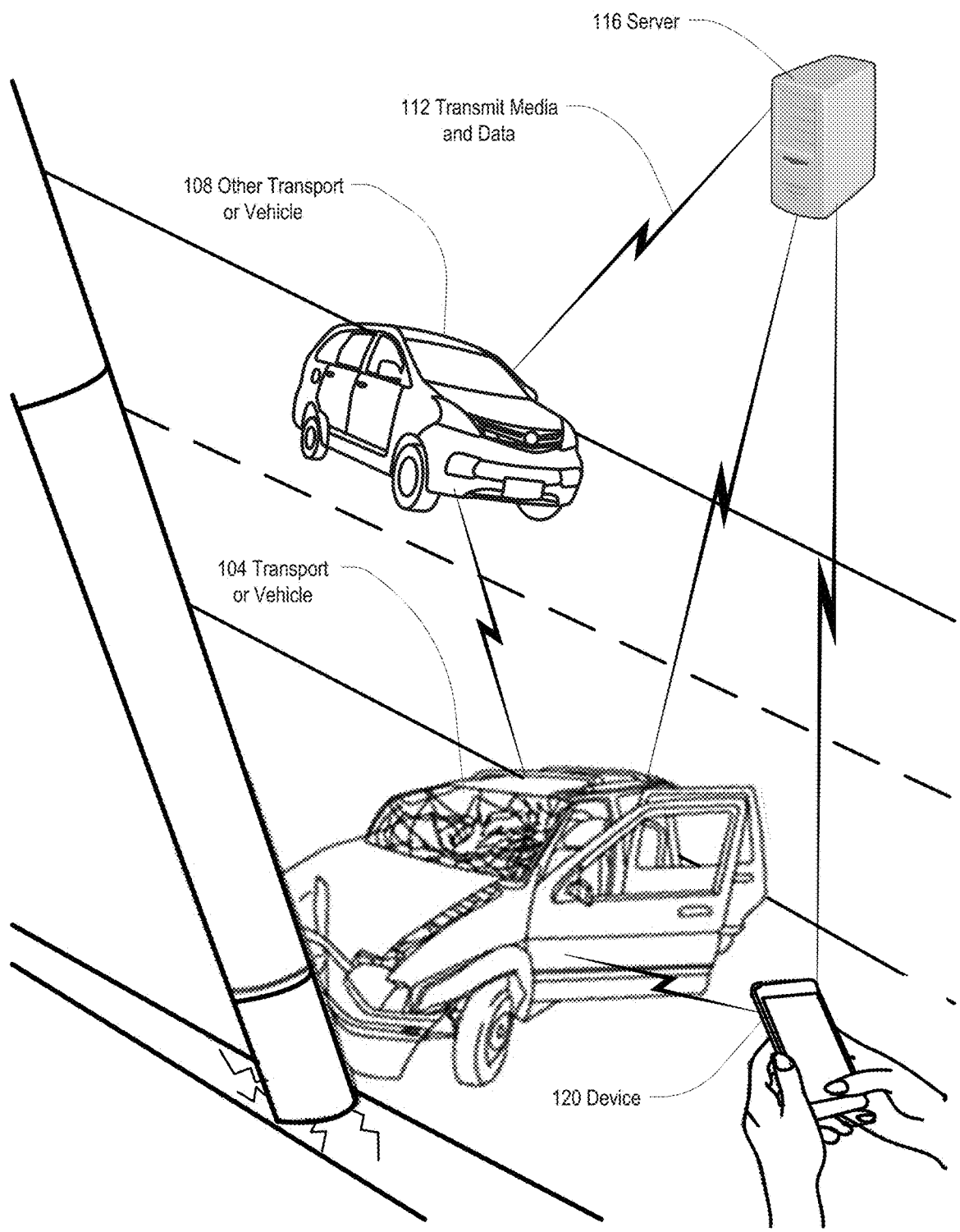
FIG. 1A is a diagram illustrating obtaining sounds from a transport in an impact, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of vehicles, cars, trucks, motorcycles, scooters, bicycles, boats, recreational transports, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a transport herein) a data collection system, a data monitoring system, a verification system, an authorization system and a transport data distribution system. The transport status condition data, received in the form of communication update messages, such as wireless data network communications and/or wired communication messages, may be received and processed to identify transport/transport status conditions and provide feedback as to the condition changes of a transport. In one example, a user profile may be applied to a particular transport/transport to authorize a current transport event, service stops at service stations, and to authorize subsequent transport rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a transport service to a particular transport and/or requesting user associated with a user profile that is applied to the transport. For example, a user may be the owner of a transport or the operator of a transport owned by another party. The transport may require service at certain intervals and the service needs may require authorization prior to permitting the services to be received. Also, service centers may offer services to transports in a nearby area based on the transport's current route plan and a relative level of service requirements (e.g., immediate, severe, intermediate, minor, etc.). The transport needs may be monitored via one or more sensors which report sensed data to a central controller computer device in the transport, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the transport is operating safely and whether the occupant user has engaged in any unexpected transport conditions, such as during the transport access period. Transport information collected before, during and/or after a transport's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user transport profile. A smart contract may be used to provide compensation, quantify a user profile score/rating/review, apply transport event permissions, determine when service is needed, identify a collision and/or degradation event, identify a safety concern event, identify parties to the event and provide distribution to registered entities seeking access to such transport event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous transports without lidar as lidar is often viewed as being expensive and unnecessary. Researchers have determined that stereo cameras are a low-cost alternative to the more expensive lidar functionality.

The instant application includes, in certain embodiments, authorizing a transport for service via an automated and quick authentication scheme. For example, driving up to a charging station or fuel pump may be performed by a transport operator and the authorization to receive charge or fuel may be performed without any delays provided the authorization is received by the service station. A transport may provide a communication signal that provides an identification of a transport that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A is a diagram illustrating obtaining sounds from a transport in an impact 100, according to example embodiments. Transports or 104 may sometimes be involved in an impact incident. Impacts may be with a stationary object as shown, such as a light pole, a building, or various permanent or temporary structures. Impacts may also be with one or more other transports 108. In some cases, instead of a direct impact or collision with a stationary object or another transport 104, the embodiments associated with FIG. 1A may also be associated with a near-impact or a dangerous driving situation. Examples of a near-impact or a dangerous driving situation may include hard breaking, swerving, weaving in traffic, driving into and/or across lanes, driving off road, tailgating, not stopping at stop signs, running red lights, or any other similar of event.

Later model transports 104 include various computers, communication devices, and sensors. These resources collectively provide navigation functions, hands-free communication, parking assistance, collision detection, and monitoring of nearby other transports 108 in order to provide more information and convenience to passengers and reduce the opportunity for impacts or accidents. These computers, communication devices, and sensors may communicate with other computers, communication devices, and sensors either within or outside of the transport 104 through various technologies such as a transport's Controller Area Network (CAN) bus, BLUETOOTH, WIFI, or the like.

Transports 104 and other transports 108 may include any type of self-propelled conveyance, including cars, motorcycles, trucks, construction equipment, or even local single passenger transports 104, 108 such as SEGWAYs or similar devices. Transports 104, 108 may have a human driver or be a driverless transport, and may or may not have any passengers. Transports 104, 108 may include cargo transports including delivery vans, mail delivery transports, and unmanned package delivery drones.

Transports 104 may include one or more front, rear, side, or dash-mounted devices such as cameras to capture and display video to the driver, and possibly to transmit outside the transport 104. Transports 104 may also include microphones to capture audio both inside the cabin as well as outside as well. Such audio may be used to communicate with outside driver assistance services such as ONSTAR or similar. In some cases, the audio may accompany video from one or more onboard cameras.

Transports 104 often include hand-free wireless interfaces in order to more safely utilize mobile communication devices such as cell phones, smart phones, or various tablets and other communication devices. These interfaces may operate with embedded applications such as CARPLAY to replicate mobile device applications and functionality with transport 104 entertainment, communication, or computing devices.

With transports 104 now able to communicate more globally with outside services and communication providers, it may be beneficial to identify individual transports 104 in order to distinguish from other transports 108. Thus, an identifier may be permanently stored or assigned to each transport 104, and the identifier may accompany any rich media content 112 (i.e. any combination of static images, video, audio, sensor data, etc) transmitted from the transport 104. Sensor data may include radar data, sonar data, magnetic detector data, optical sensor data, laser rangefinder data, or any other form of data produced by sensors associated with the transport 104, 108.

When a transport 104 is involved with an impact or accident, as previously discussed, the transport 104 is associated with the impact. In one embodiment, an event is created within an onboard computer of transport 104, and the transport 104 identifier is associated with the event. In one embodiment, the onboard computer may include a memory device to store the event and associated identifier. In one embodiment, the impact or accident is in proximity to one or more other transports 108. Proximity may be determined by several means, including a distance from a location, a distance from a GPS coordinate, a street intersection, a line of sight, a hearing limit, a same street, or a street address range. In one embodiment, the proximity may be associated with a distance from the impact defined by a geofence. Within proximity of the impact, there may be any number of other transports 108 and any number of devices 120, such as devices associated with an individual. Devices 120 may include any type of communication devices, including cell phones, smart phones, tablets, smart watches, wearable computers, or implantable computers. Devices 120 may be in the possession of a pedestrian, bicycle rider, transport 104, 108 driver, or transport 104, 108 passenger. Device 120 may also be a static device within proximity of the impact, including traffic cameras, business video cameras, or aerial drone-mounted cameras. Devices 120 may also include inherent (i.e. part of the transport 104, 108) communication devices not associated with or in the possession of any individual.

When an impact or accident occurs, a device 120 in proximity to the impact transmits media and/or data 112 related to the impact to a server 116. The media 112 may include any combination of an audio file, a video file, a text file, an image file, transport telemetry, environmental data, traffic data, or sensor data. In one embodiment, the media 112 may also include a direction for each of the sounds.

In one embodiment, a transport 104 associated with the impact may transmit the media 112. In another embodiment, another transport 108 not associated with the impact may transmit the media 112. In another embodiment, a device 120 associated with a bystander or pedestrian in proximity to the impact may transmit the media 112. In yet another embodiment, a device 120 associated with a passenger of the transport 104 associated with the impact or a device 120 associated with a passenger of another transport 108 not associated with the impact may transmit the media 112. In yet another embodiment, a device 120 associated with static camera or sensor in proximity to the impact or accident may transmit the media 112.

The server 116 may be located anywhere, including in proximity to the impact or accident or outside the proximity to the impact or accident. The server 116 receives the media 112 over any type of data connection, but most likely through wireless connections, including but not limited to cellular connections (i.e. 3G, 4G, 5G, LTE), internet or broadband connections, WIFI connections, or the like. The server 116 may include one or more applications in a memory 706, which may determine or more sounds based on the media 112. Each of the sounds may include an identification of a type of sound source (e.g. an automotive noise of a transport 104, an automotive noise of another transport 108, an impact sound associated with the transport 104, a human voice or exclamation, a warning alarm, a skidding transport 104, 108, or any other type of detected sound), a time stamp associated with a sound, a sound level or volume of the sound, a sound duration of time, and an indication of association with a different sound (e.g. a passenger voice of a passenger within the transport 104). In one embodiment, determining one or mote sounds based on the media 112 may include time stamping one or more of a start time and an end time for each sound and identifying a sound source for each of the one or more sounds. The sounds may have been recorded by the device 120 within a first predetermined time before the impact or accident and a second predetermined time after the impact or accident.

Determining the one or more sounds based on the media 112 may in some embodiments result in a file created by the server 116 with a group of parameters (identifiers, time stamps, etc as previously discussed). In some embodiments, the file may be transmitted by the server 116 or stored in a database (not shown). The server 116 may include one or more applications that perform speech recognition on sounds identified as voices. In one embodiment, the speech recognition application may determine a context based on recognized speech, where the context may include a location, a threat, a cause of the impact or accident, a fire or explosion, an injury or medical status, a name, an action, a controlled substance, a hazardous material, a crime, or actual or implied violence. In one embodiment, law enforcement may be notified if the context is applicable to law enforcement. In one embodiment, EMS or a fire department may be notified if the context is applicable to a medical condition, a fire, a hazardous material, or an explosion. In one embodiment, an insurance provider may be notified if the context is applicable to a cause of the impact or accident. The media 112 may include any number of videos. In one embodiment, the server 116 determines a number of videos based on the received media 112 and synchronizes sounds with the videos. This helps to establish more context for improved understanding by combining different but related media types 112.

Once the server 116 has determined one or more sounds based on the media 112, the server 116 may associate sounds (from devices 120 in proximity to the impact or accident) with the transport 104 involved in the impact or accident or another transport 108. By performing this association, the server 116 creates a data-driven narrative of the impact event that helps describe the roles and contribution to the impact by the transports 104, 108. It should be noted that any of the actions taken with respect to an impact or accident herein apply equally to both near-impacts as well as dangerous driving situations.

Figure 1B:
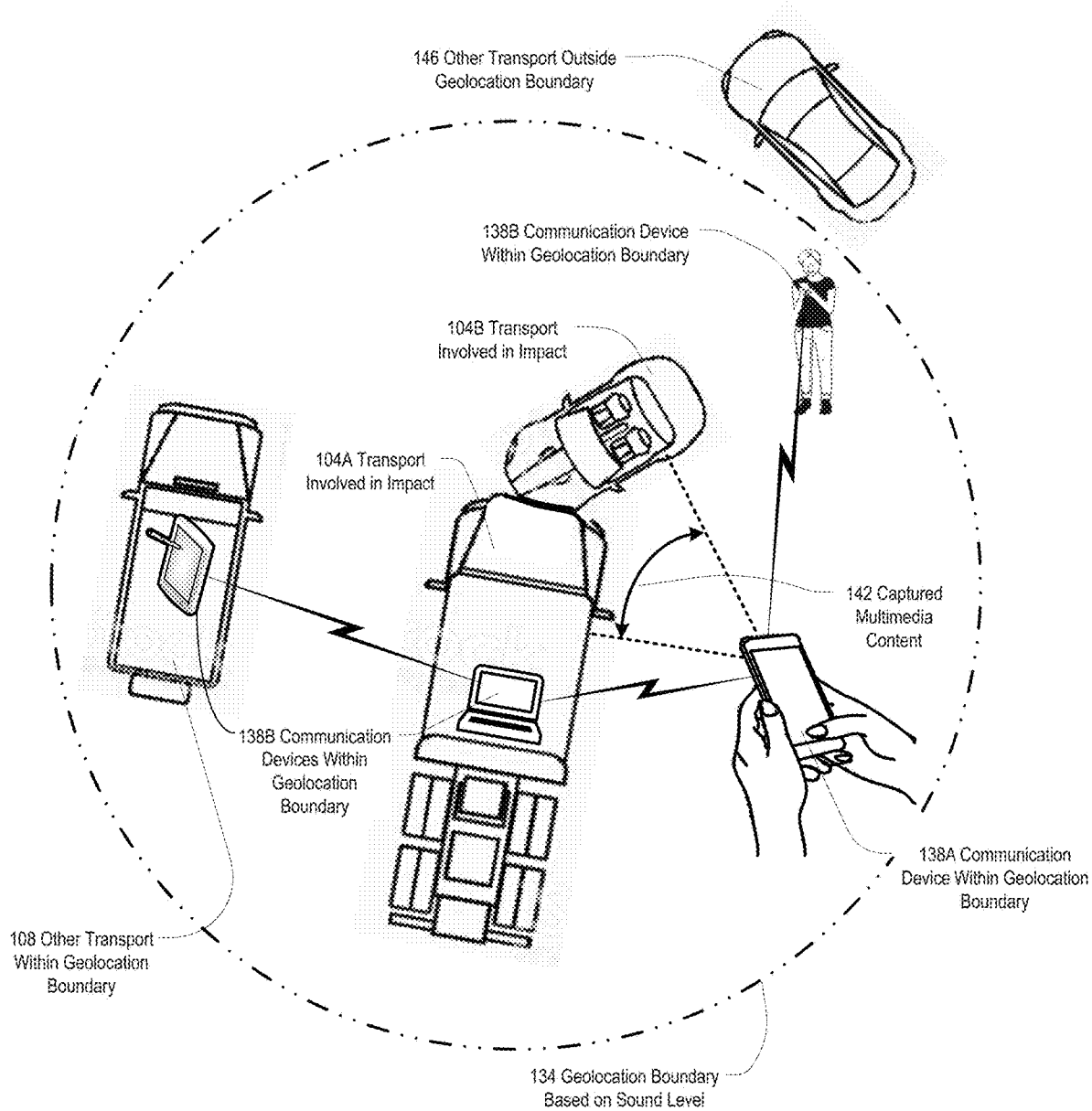
FIG. 1B is a diagram illustrating obtaining multimedia content from devices within geolocation boundaries, according to example embodiments.

FIG. 1B is a diagram illustrating obtaining multimedia content from devices within geolocation boundaries 130, according to example embodiments. Transports 104 may sometimes be involved in an impact incident or collision. It is advantageous to gather relevant data quickly after an impact or accident. Relevant data is generally local to the impact or accident, where "local" may be defined in different ways. Data that is not local to the impact or accident may be considered as less accurate or possibly misleading—and therefore not helpful to establishing facts and evidence.

An impact involving one or more transports 104, such as an impact between a first transport 104A and a second transport 104B, always produces a generally loud sound or series of sounds as a direct result of the collision. The sound level is generally measured in decibels (dB), in one example. From a point at which a sound is produced, the sound level decreases generally in proportion to distance from the sound source. That may be true for open and unimpeded areas, but is generally not true for complex environments such as cities with many buildings and structures, other transports 108, and other sound sources of varying volume. For example, a downtown intersection in a major city at noontime may have various construction noises, trains, traffic sounds, horns, voices, and other sounds emanating from different points and unpredictably changing from moment to moment. Because of other sounds that may be occurring at or near the same time as the impact, the detection range of the impact or accident may change based on where the other sounds are sourced from. That is, from a first direction, the detection range may be correspondingly short if there are other sound sources nearby. From a second direction, the detection range may be correspondingly long if there are not other sound sources nearby. From this, it is possible to define a geolocation boundary 134 for the impact based on decibel levels associated with the impact. Impacts may be with one or more other transports 108, as shown, or with a stationary object such as a light pole, a building, or various permanent or temporary structures. In some cases, instead of a direct impact or collision with a stationary object or another transport 104, the embodiments associated with FIG. 1B may also be associated with a near-impact or a dangerous driving situation. Examples of a near-impact or a dangerous driving situation may include hard breaking, swerving, weaving in traffic, driving into and/or across lanes, driving off road, tailgating, not stopping at stop signs, running red lights, or any other similar type of event.

Within the geolocation boundary 134, there may be one or more other transports 108, a second transport 104B involved in the impact, and various communication devices 138A, 138B. For example, a first pedestrian within the geolocation boundary 134 may use a first communication device 138A to capture multimedia content 142 of the impact or accident, including any involved transports 104A/104B. The first pedestrian may also transmit the captured multimedia content 142 to a second communication device 138B within the geolocation boundary, as well as to other communication devices 138B associated with a transport 104 involved in the impact and other transports 108 not directly involved in the impact or accident. Other transports outside the geolocation boundary 146 would not receive the captured multimedia content 142 from the first communication device 138A.

In some embodiments, the communication device 138 may be part of either a transport 104 involved in the impact, another transport within the geolocation boundary 108, or with a passenger of either the transport 104 involved in the impact or another transport within the geolocation boundary 108.

The captured multimedia content 142 may include any combination of audio file(s), video file(s), text file(s), image file(s), transport telemetry, environmental data, traffic data, and sensor data. The captured multimedia content 142 may be transmitted from the communication device within the geolocation boundary 138. In one embodiment, a transport involved in the impact or accident 104A, 104B may transmit sensor data to the communication device 138A, which then includes the sensor data in the captured multimedia content 142. Sensor data may include radar data, sonar data, magnetic detector data, optical sensor data, laser rangefinder data, or any other form of data produced by sensors associated with the transport 104, 108. The captured multimedia content 142 may include one or more sounds and one or more videos. In one embodiment, when communication devices 138B receive the captured multimedia content, they include one or more applications that synchronize the one or more sounds with the one or more videos.

With transports 104 now able to communicate more globally with outside services and communication providers, it may be beneficial to identify individual transports 104 in order to distinguish from other transports 108. Thus, an identifier may be permanently stored or assigned to each transport 104, and the identifier may accompany any rich media content 112. When a transport 104 is involved with an impact or accident, as previously discussed, the transport 104 is associated with the impact. In one embodiment, an event may be created within an onboard computer of transport 104, and the transport 104 identifier may be associated with the event. In one embodiment, the onboard computer may include a memory device to store the event and associated identifier. In another embodiment, the identifier may be transmitted to the communication device 142, which may include the identifier in the captured multimedia content 142.

In one embodiment, the captured multimedia content 142 may also be transmitted to a server 116 outside the geolocation boundary 134. The captured multimedia content 142 may also include one or more sounds associated with the impact and a direction for each of the sounds. The server 116 may determine a number of videos based on the received multimedia content 142, and associate one or more of the sounds with the videos. The communication device 138A or the se Ter 116 may time stamp the multimedia content with one or more of a start time and an end time for each sound and identify a sound source for each of the sounds.

In one embodiment, one or more of the communication devices 138A, 138B transmits the captured multimedia content 142 to a cloud server 116, which may store the multimedia content 142 to cloud storage. The server 116 may be located anywhere, including in proximity to the impact or accident or outside the proximity to the impact or accident. The server 116 receives the multimedia content 142 over any type of data connection, but most likely through wireless connections, including but not limited to cellular connections (i.e. 3G, 4G, 5G, LTE), internet or broadband connections, or WIFI connections. The server 116 may include one or more applications in a memory 706, which may determine or more sounds based on the multimedia content 142. Each of the sounds may include an identification of a type of sound source (e.g. an automotive noise of a transport 104A, 104B, an automotive noise of another transport 108, an impact sound associated with the transport 104A, 104B, a human voice or exclamation, a warning alarm, a skidding transport 104, 108, or any other type of detected sound), a time stamp associated with a sound, a sound level or volume of the sound, a sound duration of time, and an indication of association with a different sound (e.g. a passenger voice of a passenger within the transport 104).

Determining the one or more sounds based on the multimedia content 142 may in some embodiments result in a file created by the server 116 with a group of parameters (identifiers, time stamps, etc as previously discussed). In some embodiments, the file may be transmitted by the server 116 or stored in a database (not shown). The server 116 may include one or more applications that perform speech recognition on sounds identified as voices. In one embodiment, the speech recognition application may determine a context based on recognized speech, where the context may include a location, a threat, a cause of the impact or accident, a fire or explosion, an injury or medical status, a name, an action, a controlled substance, a hazardous material, a crime, or actual or implied violence. In one embodiment, law enforcement may be notified if the context is applicable to law enforcement. In one embodiment, EMS or a fire department may be notified if the context is applicable to a medical condition, a fire, a hazardous material, or an explosion. In one embodiment, an insurance provider may be notified if the context is applicable to a cause of the impact or accident. It should be noted that any of the actions taken with respect to an impact or accident herein apply equally to both near-impacts as well as dangerous driving situations.

Figure 1C:
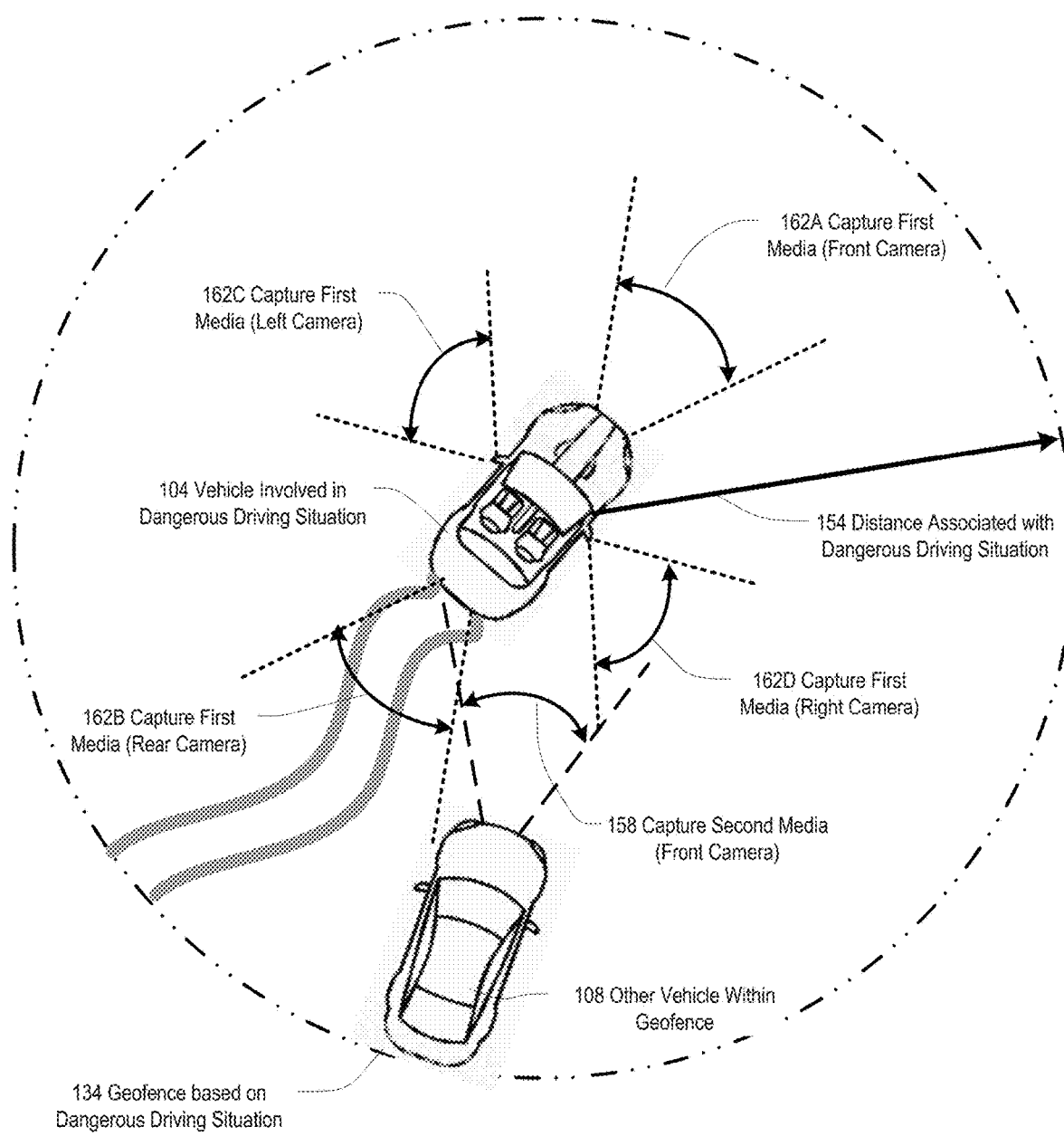
FIG. 1C is a diagram illustrating capturing media from transports within a geofence following a dangerous driving situation, according to example embodiments.

FIG. 1C is a diagram illustrating capturing media from vehicles within a geofence following a dangerous driving situation 150, according to example embodiments. A dangerous driving situation is an event involving transport 104 that does not necessarily end in an impact or accident. For example, driving too fast for local conditions, driving an unsafe transport (weak/no brakes or almost flat tire(s)), driving intoxicated (drugs or alcohol), or swerving outside marked road lanes are all examples of dangerous driving situations.

Transports 104, 108 are able to detect proximity to close transports, and provide audible and/or visual warnings to a driver when reversing, changing lanes, or approaching another transport quickly with insufficient braking, Transports 104, 108 are also able to identify many dangerous driving situations. For example, a transport 104 may detect a driver is steering erratically, speeding, changing gears dangerously, or applying insufficient or too sudden braking. This may be due to an intoxicated driver under the influence or a driver experiencing a medical condition affecting driving.

In response to identifying the dangerous driving situation, the transport 104 may capture first media. The first media 162 may include any combination of an audio file, a video file, a text file, an image file, transport telemetry, environmental data, traffic data, or sensor data. FIG. 1C illustrates a vehicle involved in a dangerous driving situation 104 that captures first media 162 from four sources: a front camera 162A, a rear camera 162B, a left-side camera 162C, and a right-side camera 162D. In other embodiments, the first media 162 may include audio and various forms of vehicular and sensor data in addition to or instead of camera video from one or more camera sources. In one embodiment, the media 162 may also include one or more forms of audio and a direction for each of the sounds.

Next, the transport 104 involved in the dangerous driving situation establishes a geofence 134 based on the dangerous driving situation. In one embodiment, the geofence is within a predetermined distance 154 of the transport 104 involved in the dangerous driving situation. Within the geofence boundaries may be one or more other transports 108, various pedestrians with communication devices, passengers with communication devices, or static communication devices associated with traffic control or local buildings.

In one embodiment, another transport 108 captures second media 158, as long as the other transport 108 is within the geofence. The second media 158 includes content of the transport 104 involved in the dangerous driving situation. The second media 158 may include any combination of an audio file, a video file, a text file, an image file, transport telemetry, environmental data, traffic data, or sensor data. FIG. 1C illustrates another vehicle within the geofence 108 that captures second media 158 through a front camera, of the rear quarter of a swerving transport 104. The first 162 and second 158 media are captured by one or more devices associated with the vehicle 104, another vehicle 108, an occupant of the vehicle 104, or an occupant of the one or more other vehicles 108.

Once the first 162 and the second 158 media have been captured, in one embodiment they may be transmitted to a server 116. The server 116 correlates the first media 162 with the second media 158 to obtain a cause for the dangerous driving situation. Each of the first 162 and second 158 media also may include one or more sounds associated with the dangerous driving situation and a direction for each of the sounds. The server 116 determines a number of videos based on the received first 162 and second 158 media and synchronizes the one or more sounds with one or more videos. The server 116 may also time stamp the first 162 and second 158 media with one or more of a start time and an end time for each sound within the first 162 and second 158 media, respectively and identify a sound source for each of the one or more sounds. In some embodiments, the transport 104 and other transport 108 may additionally transmit one or more of the first 162 and second 158 captured media related to the dangerous driving situation to storage outside the geofence, where the storage outside the geofence may include cloud storage.

Figure 1D:
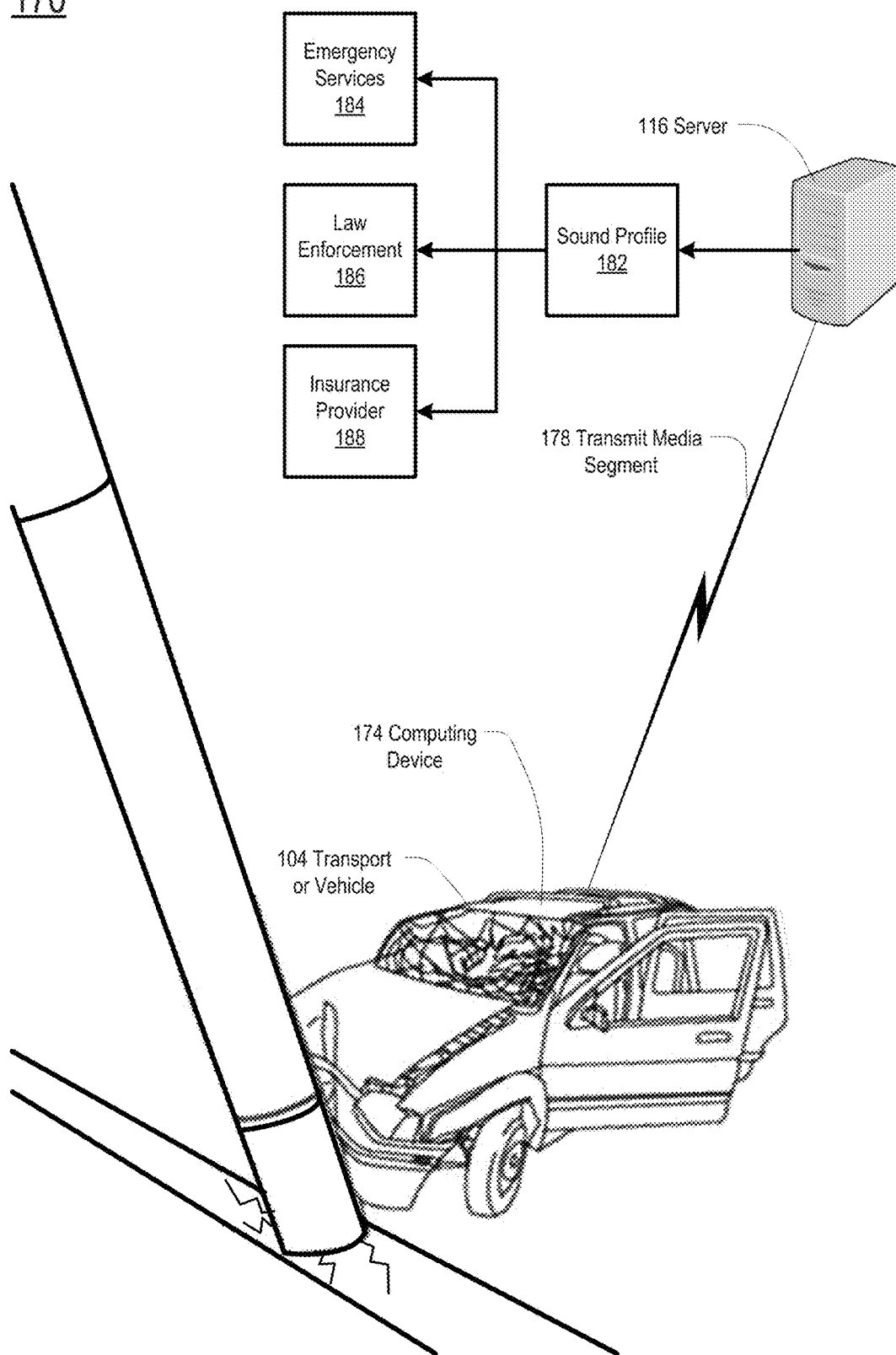
FIG. 1D is a diagram illustrating building a sound profile from a media segment corresponding to a transport impact, according to example embodiments.

FIG. 1D is a diagram illustrating building a sound profile from a media segment corresponding to a vehicle impact 170, according to example embodiments. Determining the cause of an impact or accident involving a transport or transport 104 may require obtaining more data and information and just from the impact itself. While impact data or information may provide useful information as to the severity of the impact and likely damage or injuries, the preceding and following information may help to identify conditions leading up to the impact, mechanical malfunction, environmental conditions, driver distraction, a medical emergency, and passenger actions or statements following the impact. In some cases, instead of a direct impact or collision with a stationary object or another vehicle 104, the embodiments associated with FIG. 1D may also be associated with a near-impact or a dangerous driving situation. Examples of a near-impact or a dangerous driving situation may include hard breaking, swerving, weaving in traffic, driving into and/or across lanes, driving off road, tailgating, not stopping at stop signs, running red lights, or any other similar type of event.

A transport 104 may have one or more computing devices 174 associated with the transport 104. Some computing devices 174 may be directly associated with the transport 174 itself, such as an onboard navigation or communication system. Other computing devices 174 may be directly associated with one or more passengers or the driver of the transport 104, such as but not limited to a cell phone, smart phone, tablet, or smart watch. In one embodiment, computing devices 174 capture and save media related to the impact or accident. In one embodiment, the transport 104 itself captures media related to the accident, transfers the media to a computing device 174 that stores the media, and the computing device 174 communicates the saved media related to the impact or accident as a media segment to a server 116. In yet another embodiment, the transport 104 itself captures and saves media related to the accident, transfers the media to a computing device 174 that communicates the media related to the impact or accident as a media segment 178 to a server 116. In yet another embodiment, the transport 104 itself captures the media related to the accident, transfers the media to an external computing device 174 (outside of and/or not associated with the transport 104), which communicates the media segment 178 to the server 116. The media segment 178 includes media before the impact or accident, and media following the impact or accident. The media may be captured and/or stored during a first time period before the impact and/or during a second time period after the impact. The media may include any combination of one or more audio files, video files, text files, image files, transport telemetry, environmental data, traffic data, or sensor data. The environmental data may include data related to one or more of ambient temperature, road conditions, weather, wind speed or direction, time of day, and light sources.

The server 116 receives the media segment 178 from the computing device 174. In one embodiment, one or more sounds may be extracted from the media segment 178, and the media segment 178 may also include a direction for each of the sounds. The server 116 builds a sound profile 182 from the media segment 178. In one embodiment, the sound profile 182 may include data cataloging each sound the media segment 178. The data may include a unique identifier, a starting time stamp, an ending time stamp, a duration of the sound, a maximum sound level, an identification of a sound source, a direction of the sound from the transport 104, and a distance of the sound from the transport 104. The unique identifier may, include a number of a sequence (i.e. a next available number), a description of the sound (e.g. "mechanical 1", "siren 3", etc.), or any other identifier that may differentiate each sound from every other sound in the media segment 178. The media may also include one or more videos, and the sound profile 182 may associate and/or synchronize each sound with one or more videos.

The sound profile 182 may include analysis that may be useful to first responders 184, law enforcement 186, or insurance providers 188. In one embodiment, the sound profile 182 may include identification of more ore more needed emergency services 184, such as EMS/paramedics, a fire department, hazardous material handling, or animal services. In one embodiment, the server 116 provides all or a relevant portion of the sound profile to one or more emergency service providers 184. In another embodiment, the sound profile 182 may include identification of various law enforcement functions, such as police or accident investigation resources. In one embodiment, the server 116 provides all or a relevant portion of the sound profile to one or more law enforcement services 186. In another embodiment, the sound profile 182 may include identification of more ore more needed insurance providers 188, such as insurers for the transport 104 involved in the impact or accident, insurers for other transports or transports also involved in the accident or impact, or insurers of property involved in the accident or impact. In one embodiment, the server 116 provides all or a relevant portion of the sound profile to one or more insurance providers 184. The sound profile 182 may be associated with one or more passwords, certificates, or any other form of security in order to guard privacy or protect confidential data or media.

Transports 104 involved in an impact or accident may include computing devices 174 that include storage resources for emergency services 184, law enforcement 186, and insurance providers 188. Just after an impact or accident, involved transports 104 may automatically transfer a notification to any stored emergency services 184, law enforcement 186, and/or insurance providers 188. In one embodiment, the emergency services 184, law enforcement 186, and/or insurance providers 188 may contact the server 116 to obtain all or part of the sound profile 182 from the server 116. In another embodiment, the emergency services 184, law enforcement 186, and/or insurance providers 188 may contact the transport 104 itself to obtain any stored media related to the impact or accident, separately from or in addition to obtaining all or part of the sound profile 182 from the server 116. It should be noted that any of the actions taken with respect to an impact or accident herein apply equally to both near-impacts as well as dangerous driving situations.

Figure 2A:
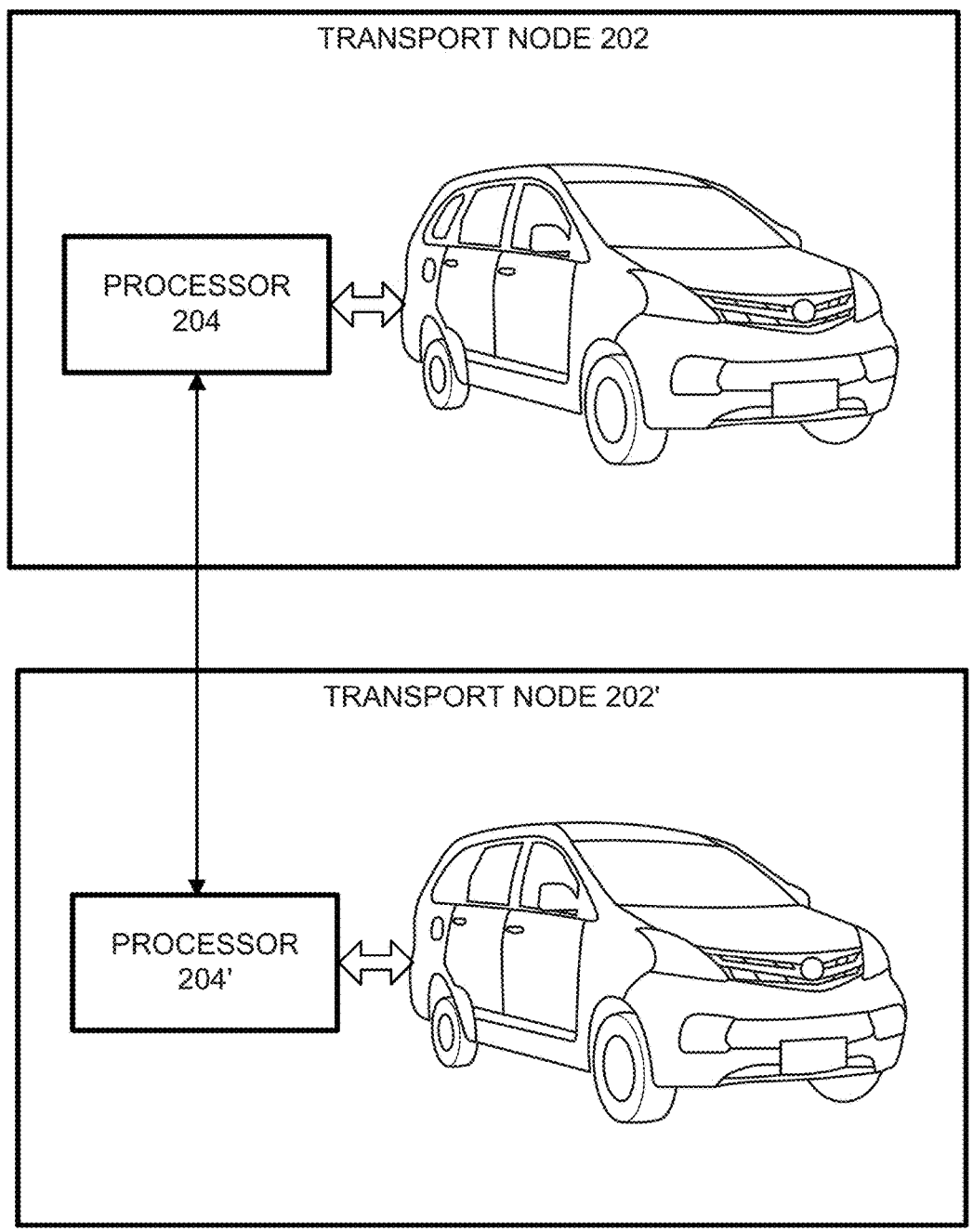
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
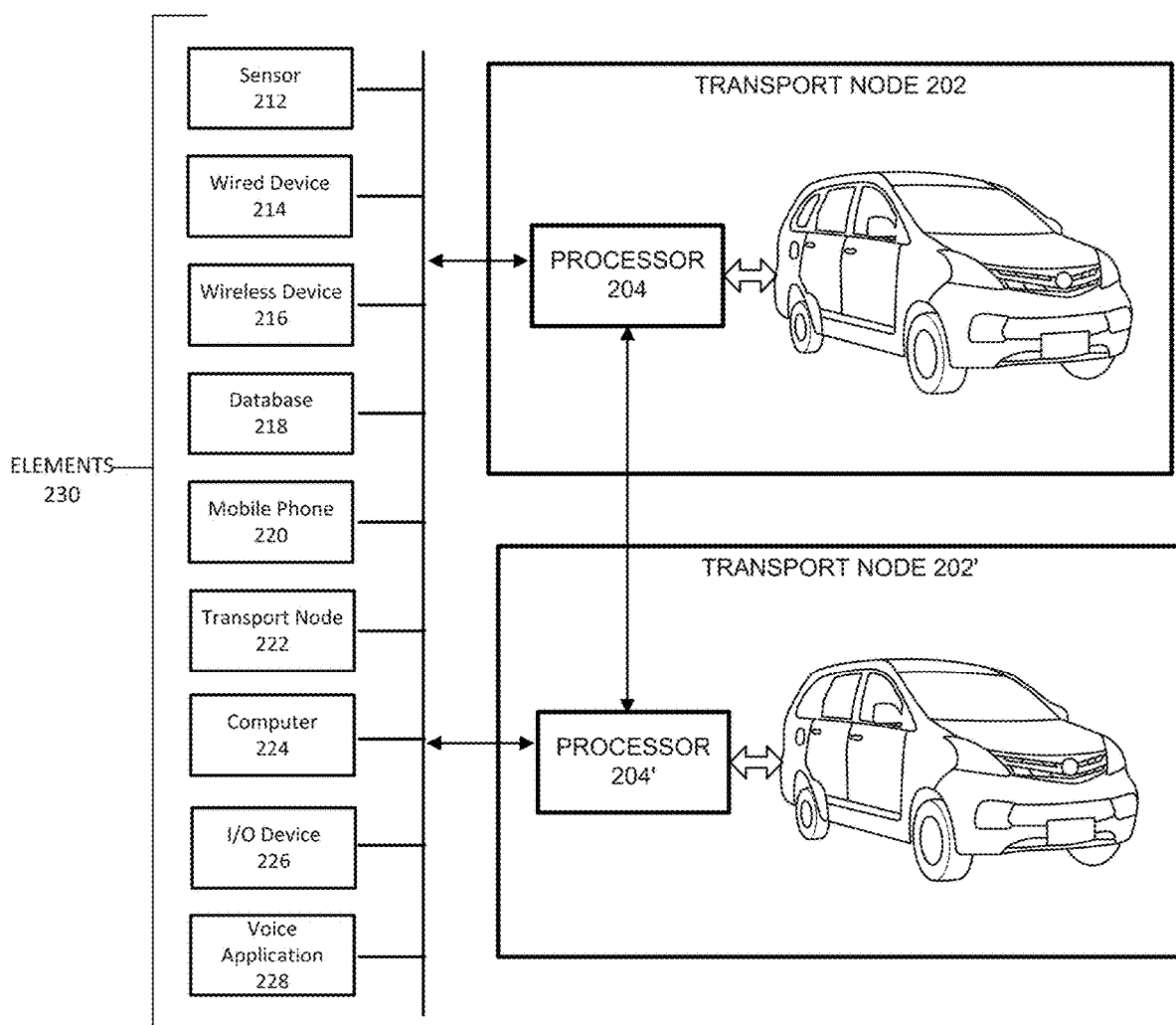
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
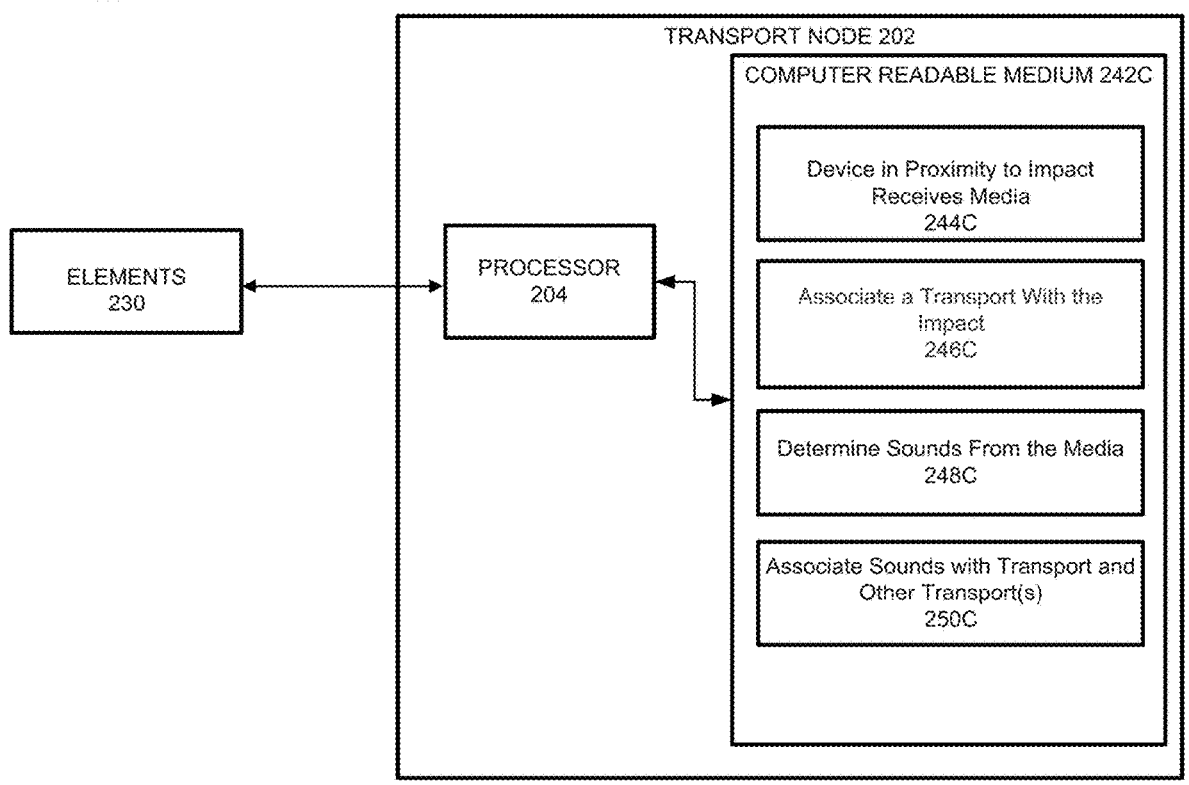
FIG. 2C illustrates yet another transport network diagram, according to example embodiments.

FIG. 2C illustrates another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of receiving, in block 244C, from a device 120 in proximity to an impact, media related to the impact, associating, in block 246C, a transport 104 with the impact, the impact in proximity to one or more other transports 108, determining, in block 248C, one or more sounds based on the media, and associating, in block 250C, the one or more sounds with one or more of the transport 104 and the one or more other transports 108.

Figure 2D:
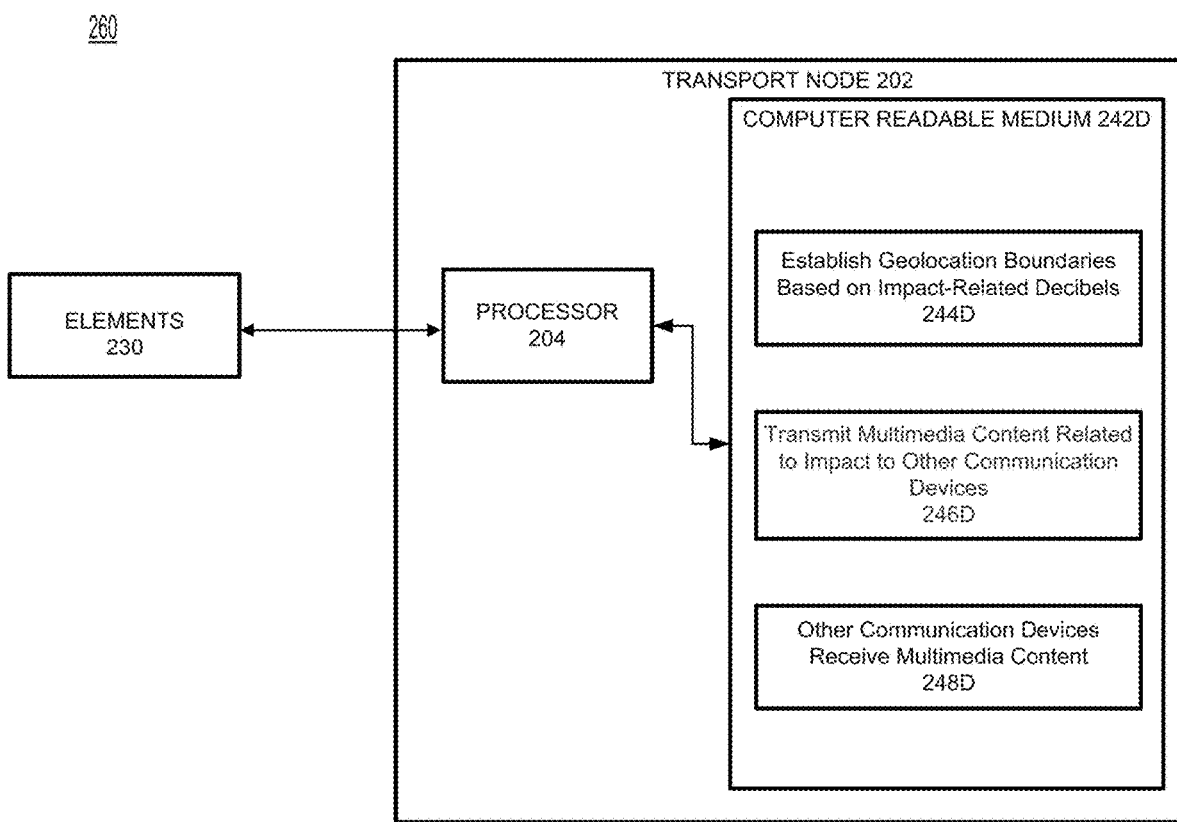
FIG. 2D illustrates a further transport network diagram, according to example embodiments.

FIG. 2D illustrates a further transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of establishing, in block 244D, geolocation boundaries 134 based on decibels associated with an impact involving one or more transports 104A/104B, transmitting, by a communication device 138A in block 246D, multimedia content 142 related to the impact to one or more other communication devices 138B within the geolocation boundaries 134, and receiving, by the one or more other communication devices 138B in block 248D, the multimedia content 142.

Figure 2E:
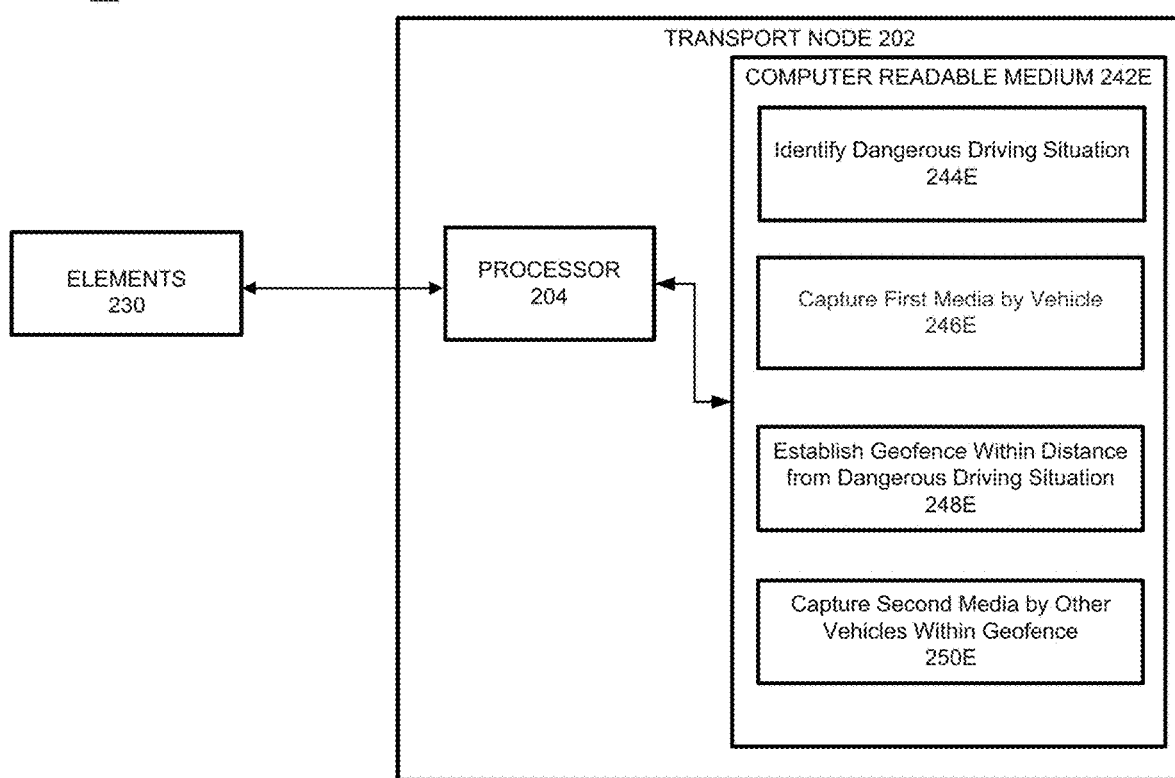
FIG. 2E illustrates a yet further transport network diagram, according to example embodiments.

FIG. 2E illustrates a yet further transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of identifying, in block 244E, a dangerous driving situation, capturing, in block 246E, first media 162 by a transport 104 involved in the dangerous driving situation, establishing a geofence 134, in block 248E, based on a distance associated with the dangerous driving situation 154, and capturing second media 158, in block 250E, by one or more other transports 108 within the geofence 134.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 2F:
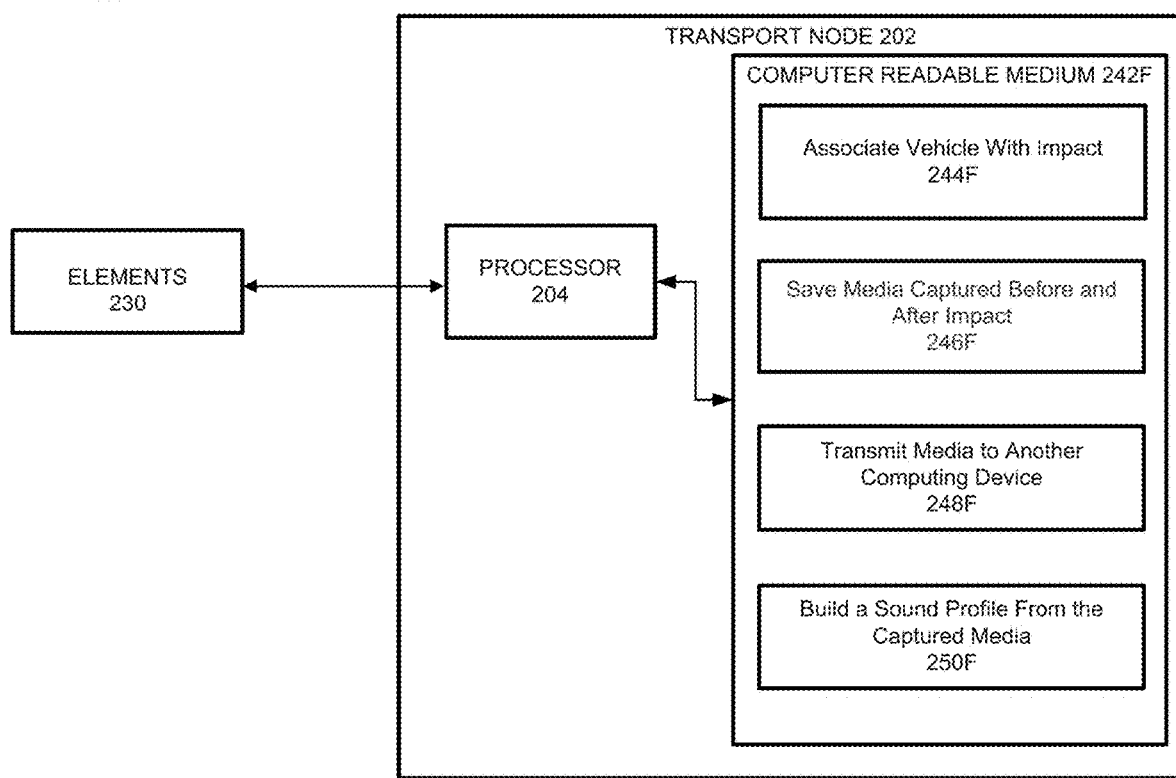
FIG. 2F illustrates a yet further transport network diagram, according to example embodiments.

FIG. 2F illustrates a yet further transport network diagram 280, according to example embodiments. The network comprises elements including a transport node 202 including a processor 204 and a non-transitory computer readable medium 242F. The processor 204 is communicably coupled to the computer readable medium 242F and elements 230 (which were depicted in FIG. 2B).

The processor 204 performs one or more of associating, in block 244F, a transport 104 with an impact, saving, in block 246F, media captured before and after the impact as a media segment 178, transmitting, by a computing device 174 in block 248F associated with the transport, the media segment 178 to another computing device 116, and building, in block 250F, a sound profile 182 from the media segment 178.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 3A:
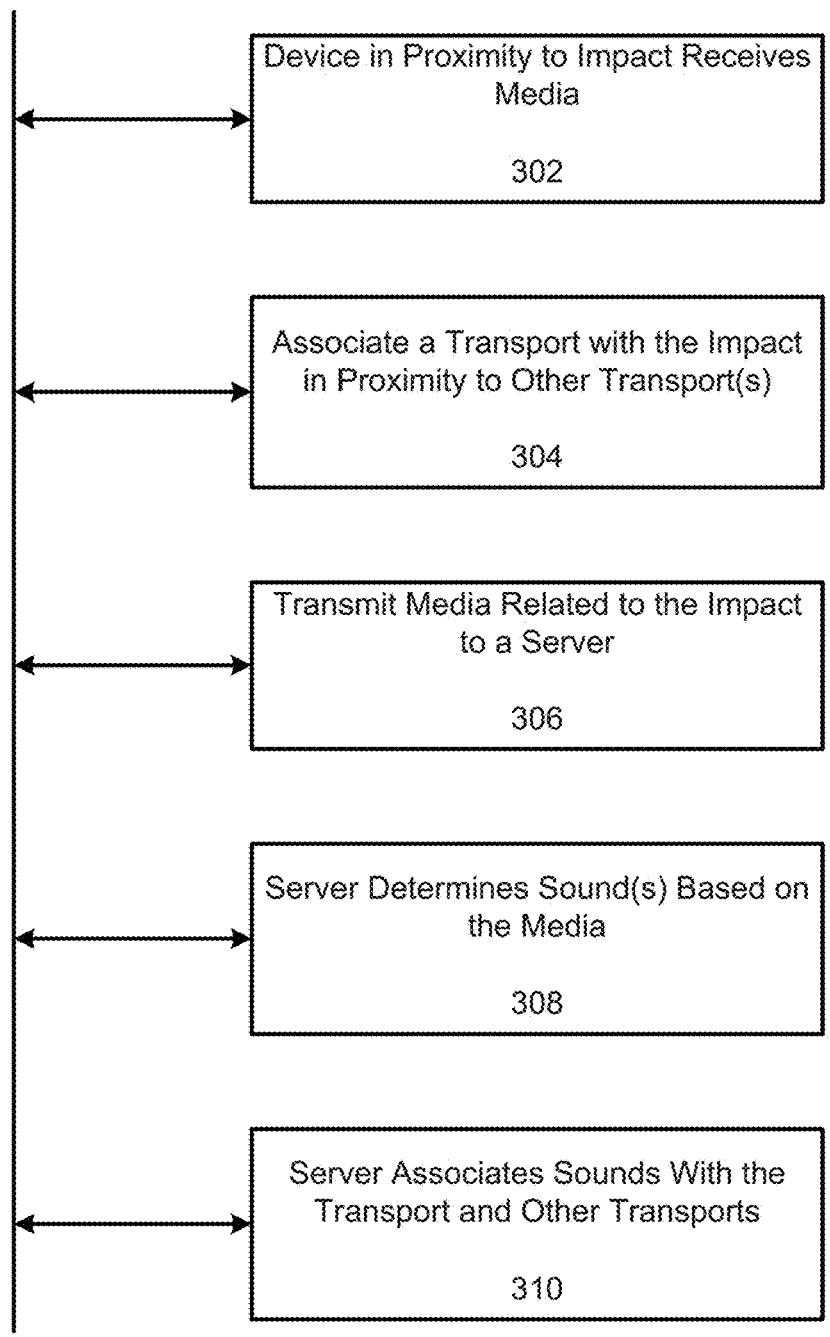
FIG. 3A illustrates a flow diagram, according to example embodiments.

FIG. 3A illustrates a flow diagram 300, according to example embodiments. Referring to FIG. 3A, a device in proximity to an impact receives media related to the impact 302. In one embodiment, a transport 104 includes one or more accelerometers that detect rapid, unusual, and possibly instantaneous deceleration. The accelerometers may trigger initiation of video, audio, sensor, and data media capture for the transport 104. This may be coupled with either instantaneous streaming or delayed transfer of the media to other devices 120, which may be associated with the driver or one or more passengers of the transport 104, or a device 120 outside the transport 104. The media may include an identifier for the transport, as described herein.

A transport is associated with the impact, which is in proximity with other transports 304. The media may include an identifier for a transport 104 involved in the impact or accident (there may be multiple transports 104, and therefore multiple identifiers). The identifier, present within the media, associates the transport 104 with the impact. On or more other transports 108 are within proximity to the impact or accident, as previously described with respect to FIG. 1A. Proximity may be defined in many ways, but generally is within direct line-of-sight of the impact and/or within hearing range of the impact. In one embodiment, proximity may be determined at one or more of before the impact, at the same time as the impact, or after the impact.

Media related to the impact is then transmitted to a server 306. In some embodiments, the transport 104 or another transport 108 may directly transmit the media to the server 116 through a wireless connection including, but not limited to, BLUETOOTH, WIFI, a cellular connection, or a satellite connection.

The server determines one or more sounds, based on the media 308. In one embodiment, the server 116 parses individual sounds from the media and creates a data structure identifying (to the extent possible) each detected sound. The data structure may include a unique identifier for each sound, an indication if the sound is associated or not associated with the impact, a start time stamp, an end time stamp, and duration for each sound, a sound level or volume, a sound source, and a type of each sound. For sounds identified as speech or a human exclamation, a voice recognition software application in the server 116 may determine text from the recognized speech, and context for the text. In one embodiment, if the context suggests or requests assistance in any way, the server may provide a notification to an appropriate service provider through email, a text message, a voice call, or any other communication method.

Finally, the server associates the sounds with the transport and the other transports 310. The analysis performed by the server 116 attempts to identify each sound in the received media. As part of this analysis, the source of each sound is identified, if possible—including sounds associated with the transport 104 and each of the other transports 108. If a specific transport 104, 108 may not be determined directly, volume and direction information may be extracted from the sounds, which may then indicate a specific transport 104, 108. In one embodiment, the server 116 receives media and data 112 from multiple sources, possibly including a transport 104 involved in the impact, one or more other transports 108, and one or more other devices 120. An application of server 116 may cross-analyze each of the sounds between each of the received media and data streams 112, and based on volume cues and location information (GPS coordinates, for example), be able to make intelligent estimation of sources for each sound element. From this, a map of events and actions may be determined to facilitate reliable and rapid accident investigation and impact or accident cause determination.

Figure 3B:
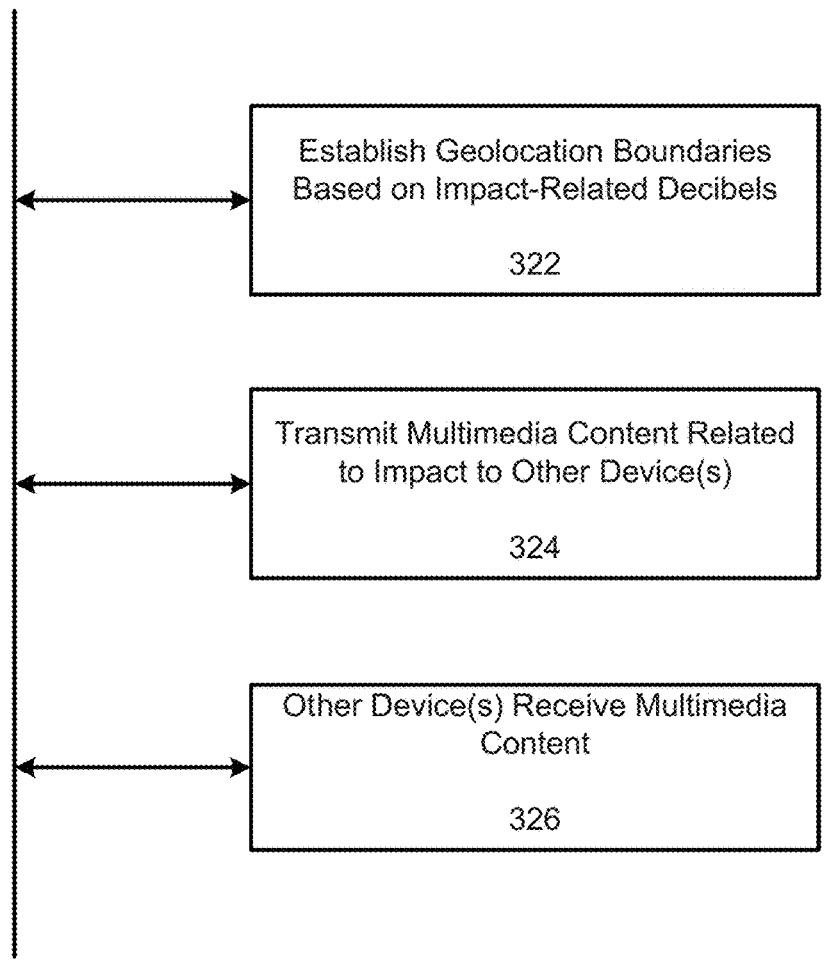
FIG. 3B illustrates another flow diagram, according to example embodiments.

FIG. 3B illustrates another flow diagram 320, according to example embodiments. Referring to FIG. 3B, geolocation boundaries 134 are established based on impact-related decibels 322. Geolocation boundaries 134 define an area of interest related to the impact or accident. The area of interest may be generally centered on the specific location if the impact or accident, but need not be circular in shape. It may be irregular, with a longer axis in one or more directions and a shorter axis in one or more other directions. For example, an accident or impact may occur at an intersection of two streets. Other media or communication devices 138 may be unpredictably oriented around the impact or accident site, such as by merchants, pedestrians, or workers nearby. Each such device 138 may receive and detect audio related to the impact or accident, and an application within each communication device 138 may determine if the received audio is above a predetermined threshold. If the application determines the received audio is not above a predetermined threshold, reflecting either too far away to be useful or too low a level to analyze the audio and produce useful data, the received audio may be disregarded. If instead the application determines the received audio is above a predetermined threshold, the application may save the audio, forward or stream the audio and any associated media to the server, and/or save geolocation coordinates for the current device 138. The coordinates may additionally be transferred to a server 116 in order for an application in server 116 to construct a 2-D geolocation map of the impact or accident. In one embodiment, the coordinates may be provided along with a unique identifier for the devices 138A, 138B which transmit the coordinates and any accompanying video, audio, data, or sensor data from devices 138A, 138B.

Multimedia content 142 related to the impact is transmitted to one or more other devices 324. Finally, the other devices 138 receive the multimedia content 326. The device(s) 138 and each of the transports 104A, 104B within the geolocation boundaries 134 may transmit multimedia content 142 to other devices 138 within the geolocation boundaries 134.

Figure 3C:
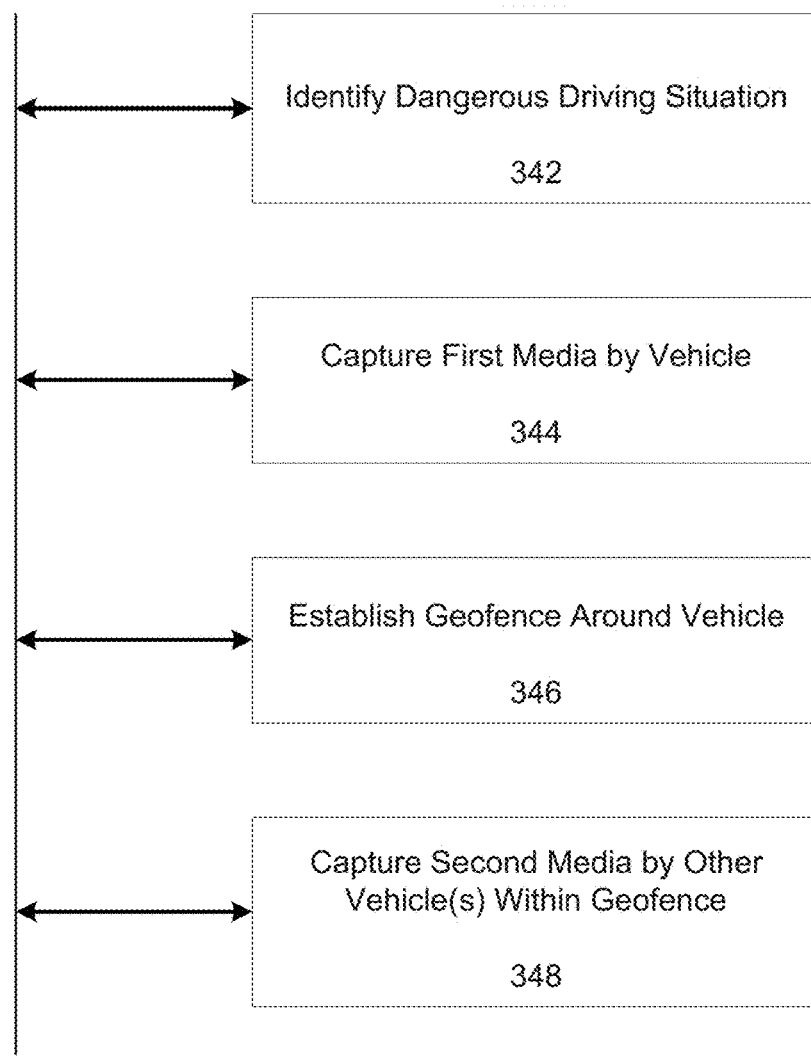
FIG. 3C illustrates yet another flow diagram, according to example embodiments.

FIG. 3C illustrates yet another flow diagram 340, according to example embodiments. Referring to FIG. 3C, a dangerous driving situation is identified 342, as previously described. In one embodiment, accelerometers within the vehicle involved in the dangerous driving situation 104 may detect the vehicle 104 driving erratically, and may trigger any of camera, audio, or sensor capture thereafter. In another embodiment, one or more cameras 162 or sensors within the vehicle involved in the dangerous driving situation 104 may detect erratic video, unpredictable and rapid steering changes, or speeds well in excess of speed limits (for example), and in response trigger any of camera, audio, or sensor capture thereafter. In yet another embodiment, a microphone within the vehicle involved in the dangerous driving situation 104 may provide audio to a speech recognition application within the transport 104 and detect speech patterns or language suggesting, stating, or implying an impaired driver.

Next, after identifying the dangerous driving situation, first media is captured by the vehicle involved in the dangerous driving situation 344. First media may include any combination of video, audio, sensor data, and environmental data from single or multiple sources. For example, a car 104 may have multiple cameras 162 that may be used to capture video or images to different directions relative to the vehicle 104.

A geofence is then established around the vehicle 346, based on distance 154 from the dangerous driving situation. In one embodiment, this distance 154 may be a predetermined value that is always the same. In another embodiment, the distance 154 may be based on the type of location where the dangerous driving situation occurs—for example, 100 feet for an urban situation, 200 feet for a suburban situation, and 1000 feet for a rural situation. In yet another embodiment, the distance 154 may be based on a number of other vehicles 108 in proximity to the event—for example, a distance 154 to allow media capture from the closest three sources may set the geofence distance to 85 feet if all three vehicles 108 are within an 85 foot radius of the dangerous driving situation.

Finally, second media is captured by one or more other vehicles 108 within the geofence 348. The second media is from the other vehicle's perspective 108, and likely includes at least partially media providing data on the dangerous driving situation. As with the first media, the second media may include any combination of video, audio, sensor data, and environmental data from single or multiple sources. For example, a vehicle 108 may have a front camera 158 that may be used to capture video or images from a front direction relative to the vehicle 108. This may beneficially provide additional data that may support or refute data from the first media. After capturing the first and the second media, many follow-on actions may be possible. For example, one or more vehicles 104, 108 may transfer first and second media to law enforcement, insurance provider, or other resources to take appropriate action. The appropriate action may include providing a warning to the driver of the vehicle involved in the dangerous driving situation 104, providing a traffic or other citation to the driver of the vehicle involved in the dangerous driving situation 104, raising insurance rates for the driver of the vehicle involved in the dangerous driving situation 104, notifying a next of kin for the driver of the vehicle involved in the dangerous driving situation 104, or notifying police dispatch of the location and circumstances of the dangerous driving situation.

Figure 3D:
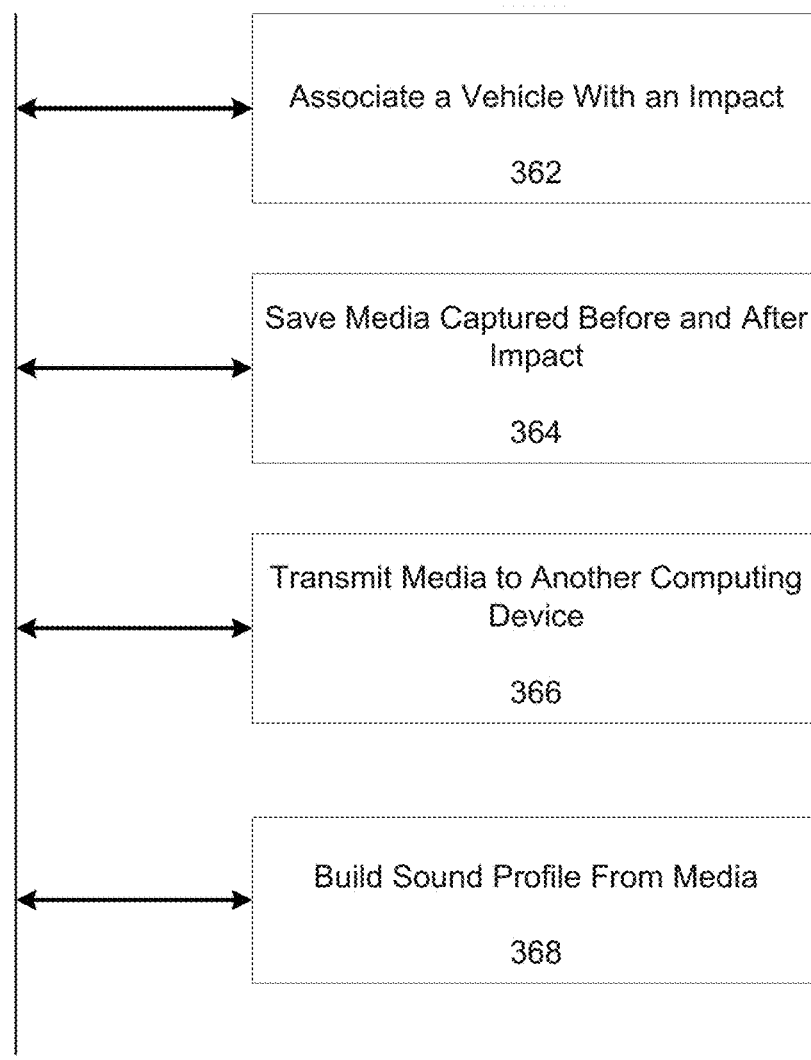
FIG. 3D illustrates yet another flow diagram, according to example embodiments.

FIG. 3D illustrates yet another flow diagram 360, according to example embodiments. Referring to FIG. 3D, a vehicle is associated with an impact 362. A vehicle may be associated with the impact, which may be in proximity with other vehicles. Media related to the impact may be captured from several sources may and include an identifier for a transport 104 involved in the impact or accident (there may be multiple vehicles 104, and therefore multiple identifiers). The identifier, present within the media, associates the vehicle 104 with the impact.

Media is captured both before and after the impact, and saved 364. The transport 104 may include one or more computing devices 174 that may transmit a media segment 178—including media captured both before and after the impact—to a server 116 for further processing.

The captured media is transmitted to another computing device 366. Finally, a sound profile is built from the captured media 368. This has been previously described in detail with respect to FIG. 1D.

Figure 4:
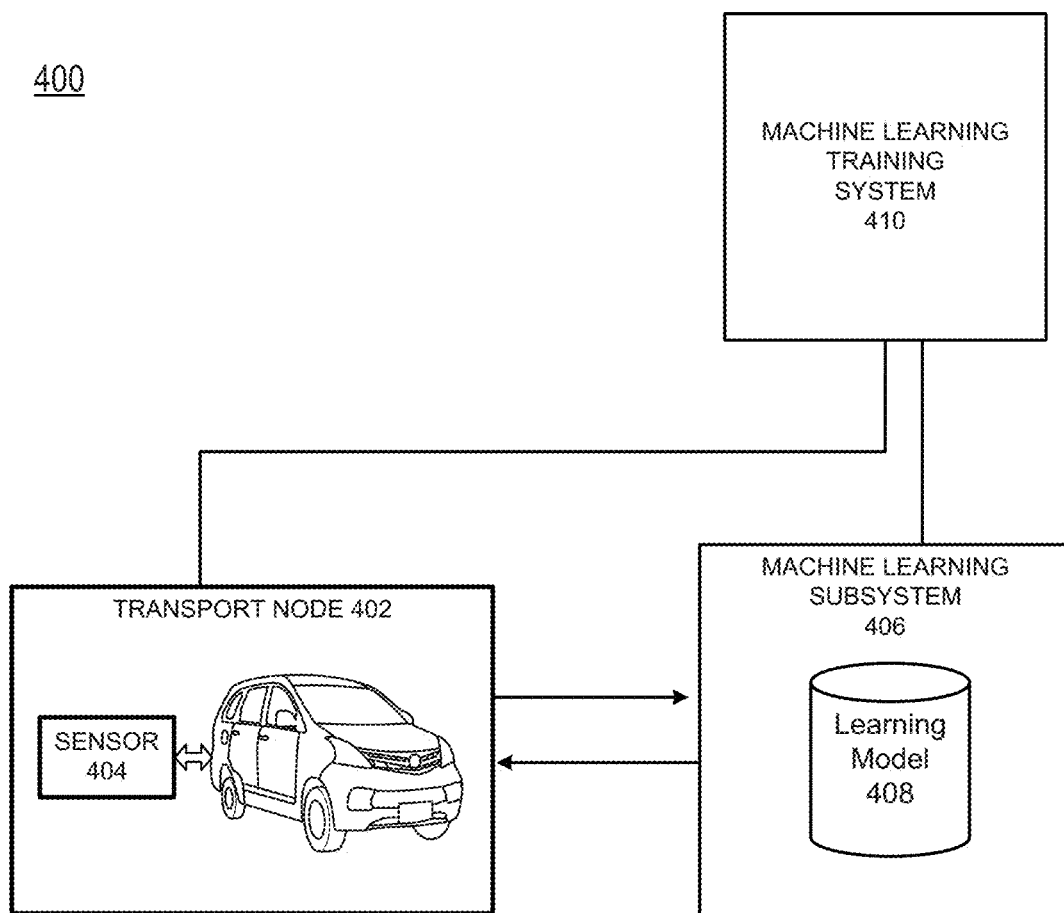
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
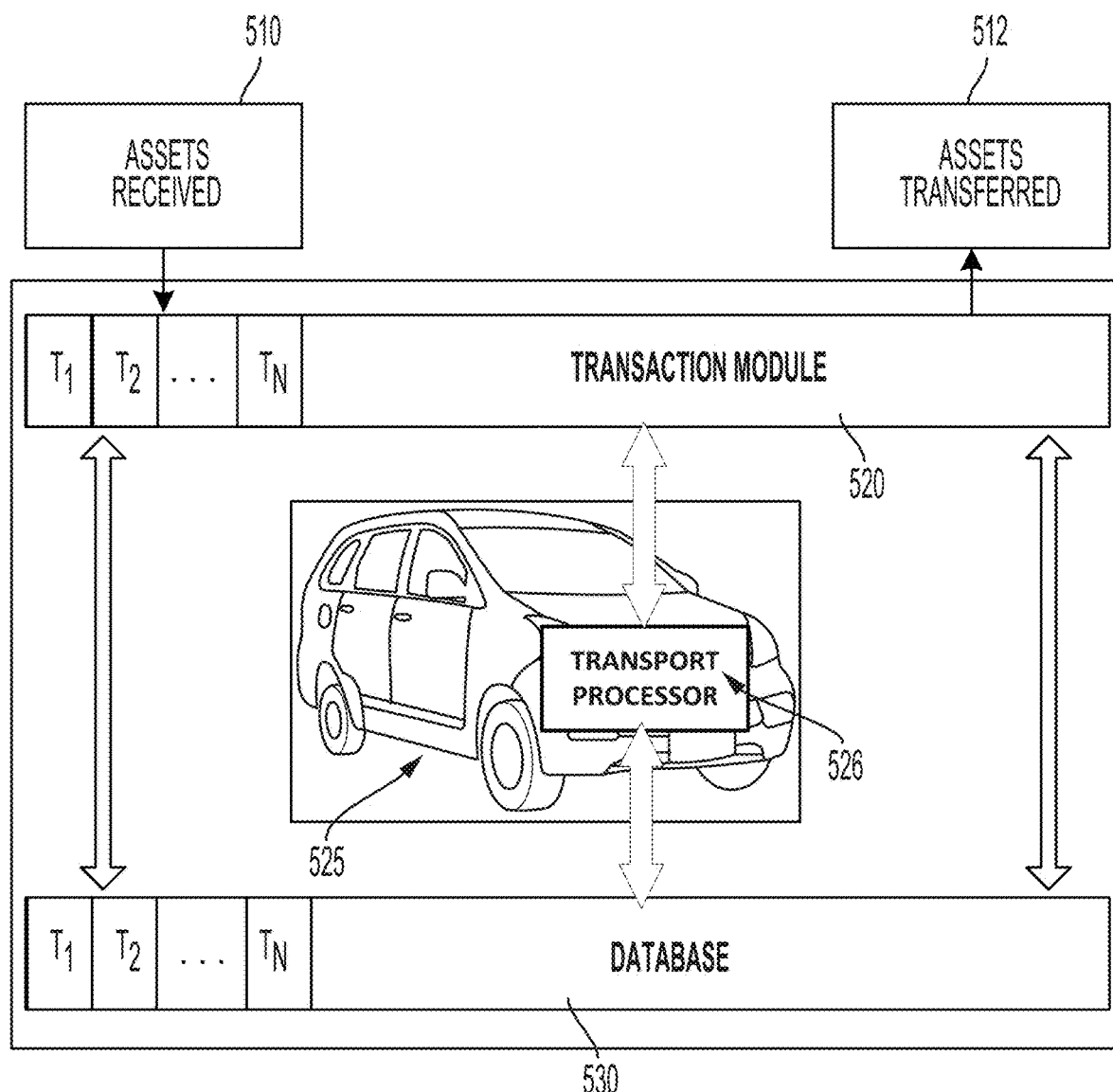
FIG. 5A illustrates an example transport configuration for managing database transactions associated with a transport, according to example embodiments.

FIG. 5A illustrates an example transport configuration 500 for managing database transactions associated with a transport, according to example embodiments. Referring to FIG. 5A, as a particular transport/transport 525 is engaged in transactions (e.g., transport service, dealer transactions, delivery/pickup, transportation services, etc.), the transport may receive assets 510 and/or expel/transfer assets 512 according to a transaction(s). A transport processor 526 resides in the transport 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
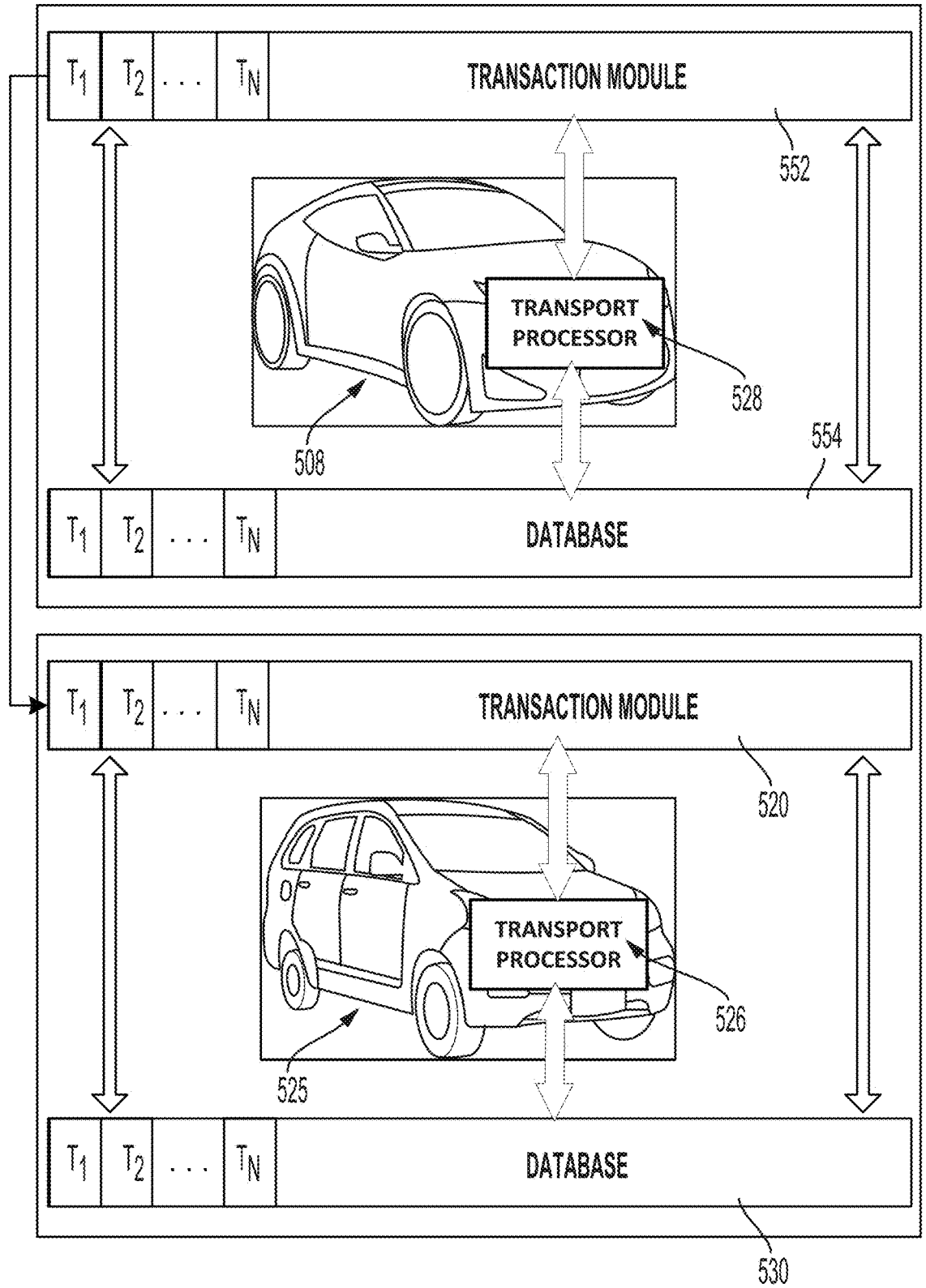
FIG. 5B illustrates another example transport configuration for managing database transactions conducted among various transports, according to example embodiments.

FIG. 5B illustrates an example transport configuration 550 for managing database transactions conducted among various transports, according to example embodiments. The transport 525 may engage with another transport 508 to perform various actions such as to share, transfer, acquire service calls, etc. when the transport has reached a status where the services need to be shared with another transport. For example, the transport 508 may be due for a battery charge and/or may have an issue with a tire and may be in route to pick up a package for delivery. A transport processor 528 resides in the transport 508 and communication exists between the transport processor 528, a database 554, a transport processor 528 and the transaction module 552. The transport 508 may notify another transport 525 which is in its network and which operates on its blockchain member service. A transport processor 526 resides in the transport 525 and communication exists between the transport processor 526, a database 530, the transport processor 526 and a transaction module 520. The transport 525 may then receive the information via a wireless communication request to perform the package pickup from the transport 508 and/or from a server (not shown). The transactions are logged in the transaction modules 552 and 520 of both transports. The credits are transferred from transport 508 to transport 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
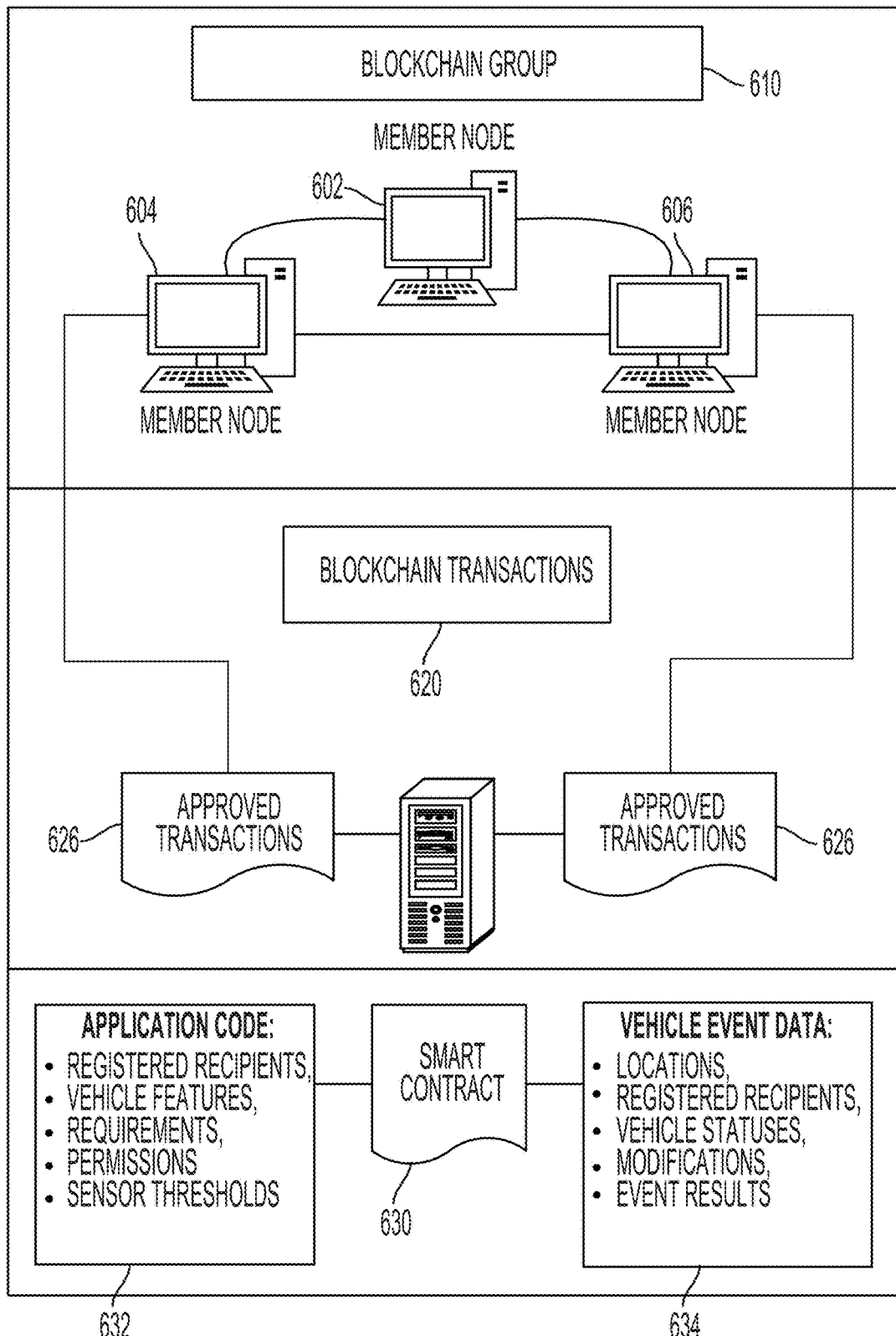
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, transport features, requirements, permissions, sensor thresholds, etc. The code may be configured to identify whether requesting entities are registered to receive transport services, what service features they are entitled/required to receive given their profile statuses and whether to monitor their actions in subsequent events. For example, when a service event occurs and a user is riding in the transport, the sensor data monitoring may be triggered, and a certain parameter, such as a transport charge level, may be identified as being above/below a particular threshold for a particular period of time, then the result may be a change to a current status which requires an alert to be sent to the managing party (i.e., transport owner, transport operator, server, etc.) so the service can be identified and stored for reference. The transport sensor data collected may be based on types of sensor data used to collect information about transport's status. The sensor data may also be the basis for the transport event data 634, such as a location(s) to be traveled, an average speed, a top speed, acceleration rates, whether there were any collisions, was the expected route taken, what is the next destination, whether safety measures are in place, whether the transport has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
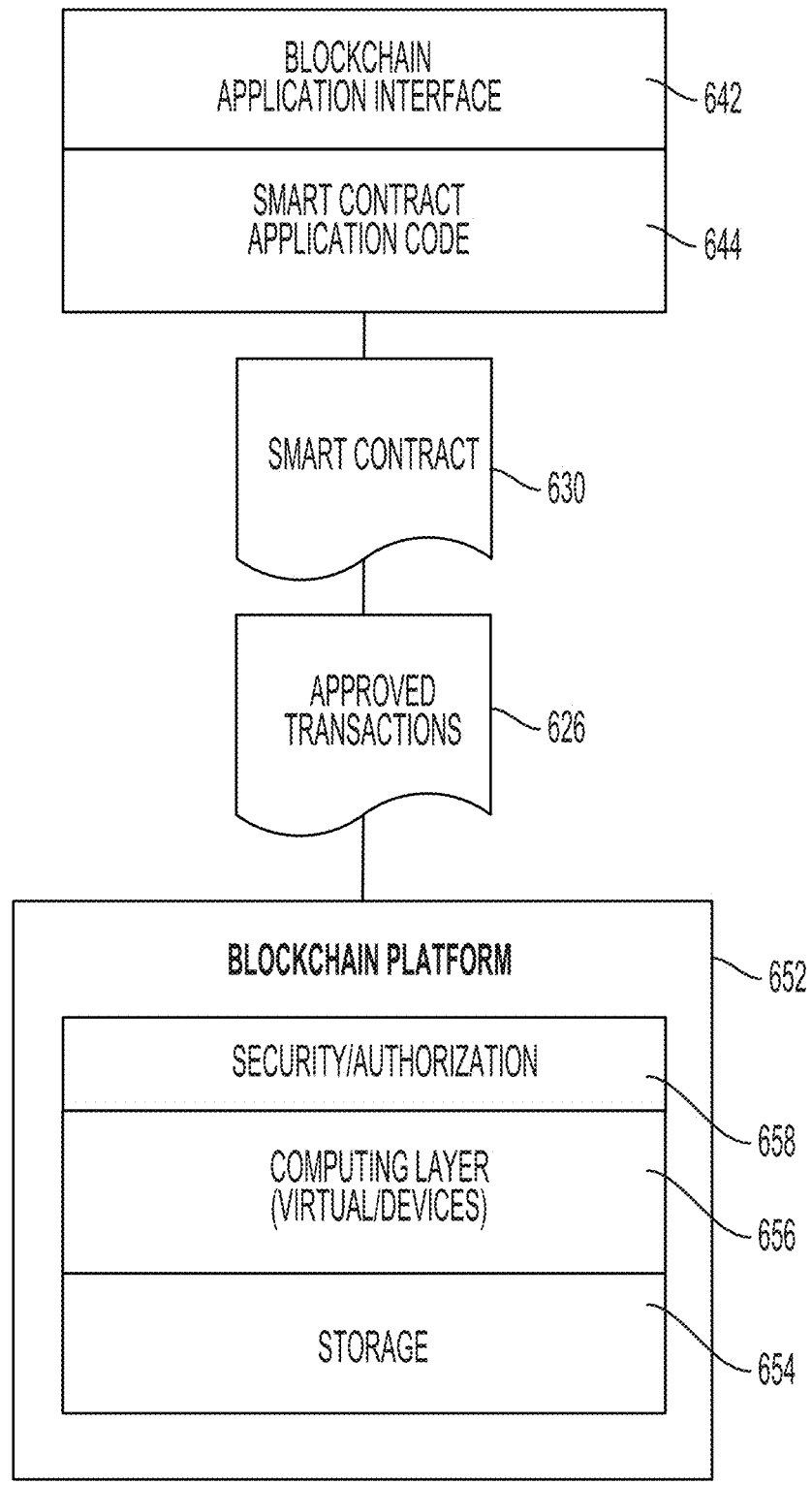
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
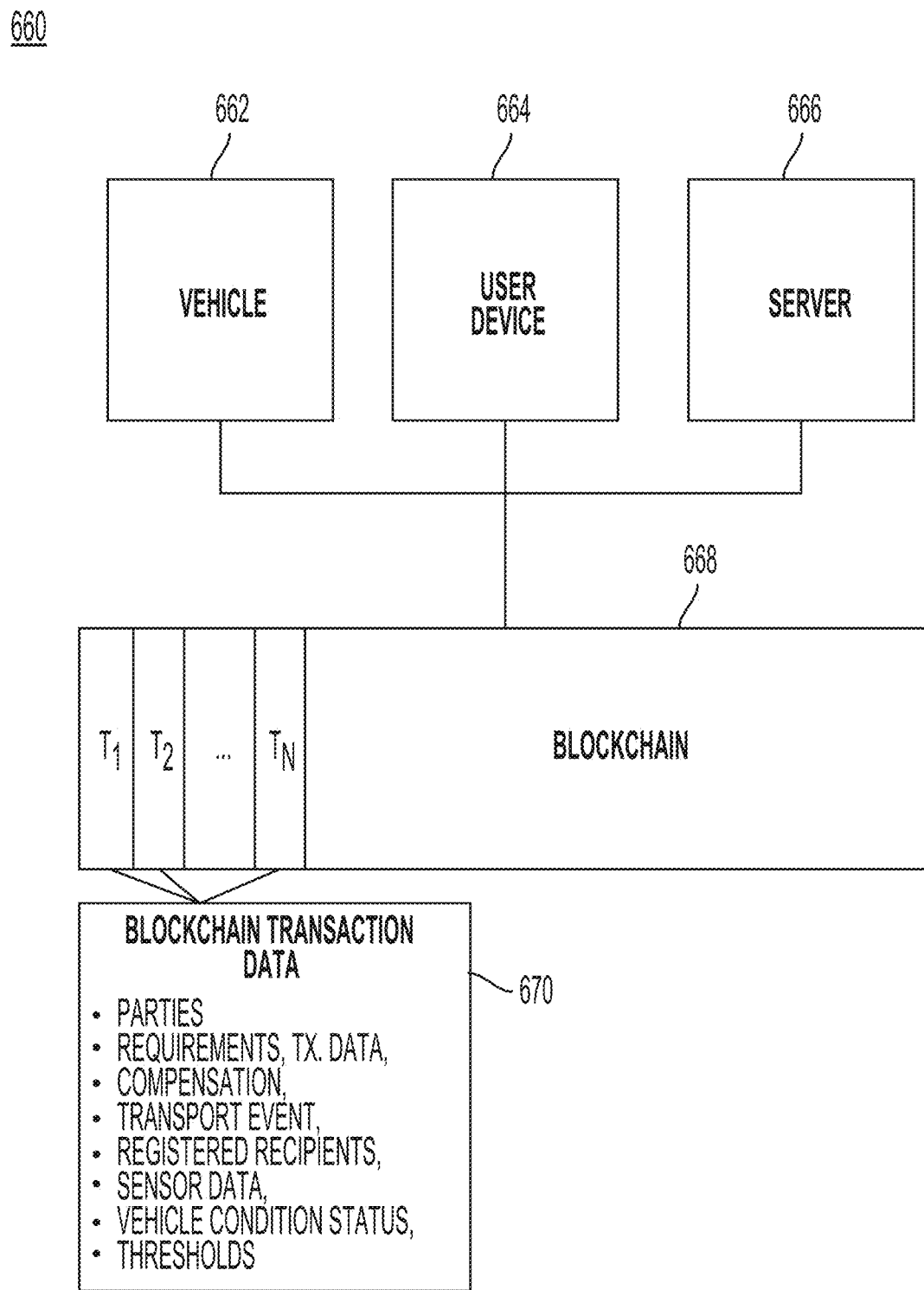
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the transport 662, the user device 664 and a server 666 sharing information with a distributed ledger (i.e., blockchain) 668. The server may represent a service provider entity inquiring with a transport service provider to share user profile rating information in the event that a known and established user profile is attempting to rent a transport with an established rated profile. The server 666 may be receiving and processing data related to a transport's service requirements. As the service events occur, such as the transport sensor data indicates a need for fuel/charge, a maintenance service, etc., a smart contract may be used to invoke rules, thresholds, sensor information gathering, etc., which may be used to invoke the transport service event. The blockchain transaction data 670 is saved for each transaction, such as the access event, the subsequent updates to a transport's service status, event updates, etc. The transactions may include the parties, the requirements (e.g., 18 years of age, service eligible candidate, valid driver's license, etc.), compensation levels, the distance traveled during the event, the registered recipients permitted to access the event and host a transport service, rights/permissions, sensor data retrieved during the transport event operation to log details of the next service event and identify a transport's condition status, and thresholds used to make determinations about whether the service event was completed and whether the transport's condition status has changed.

Figure 6D:
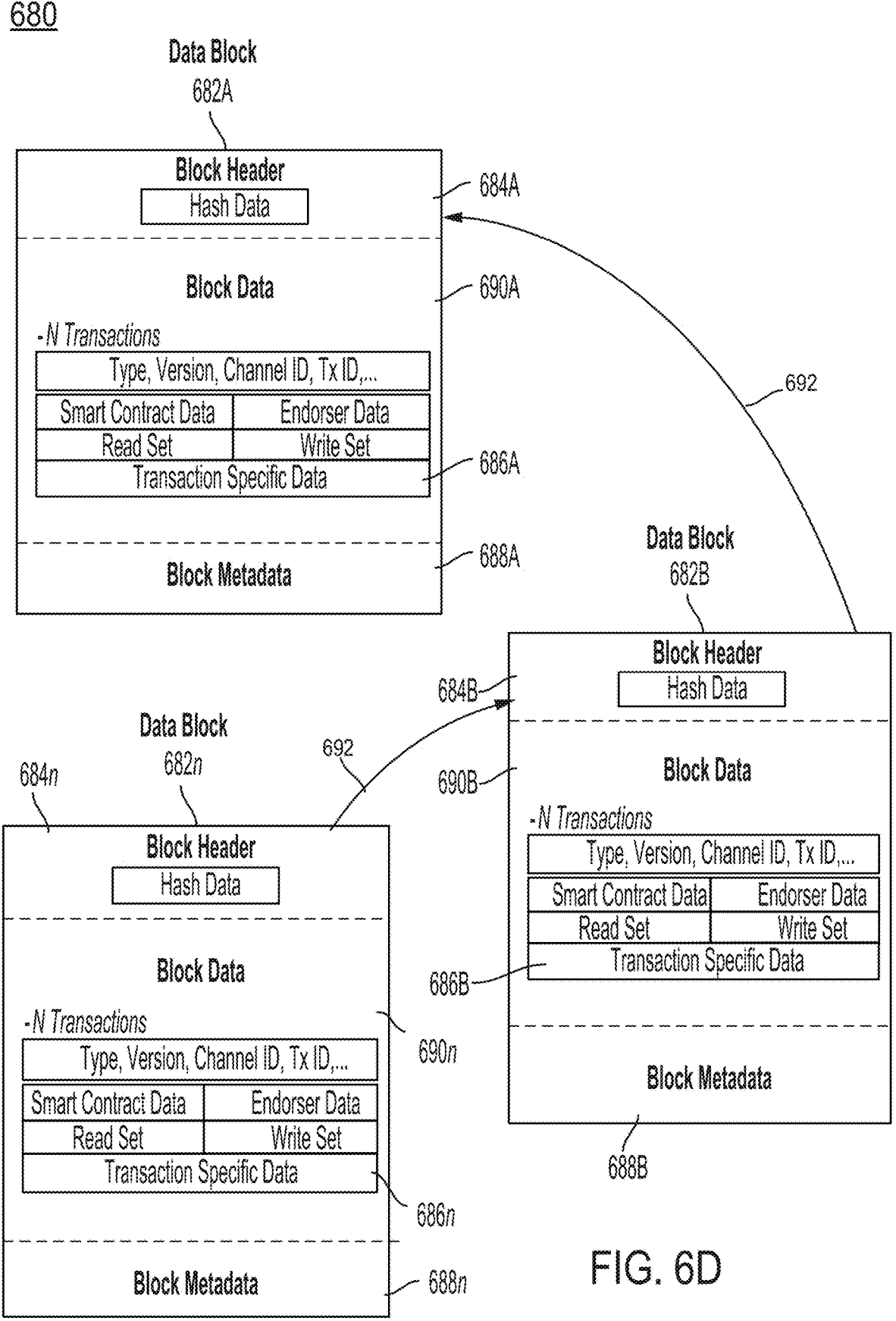
FIG. 6D illustrates example data blocks, according to example embodiments.

FIG. 6D illustrates blockchain blocks 680 that can be added to a distributed ledger, according to example embodiments, and contents of block structures 682A to 682*n*. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
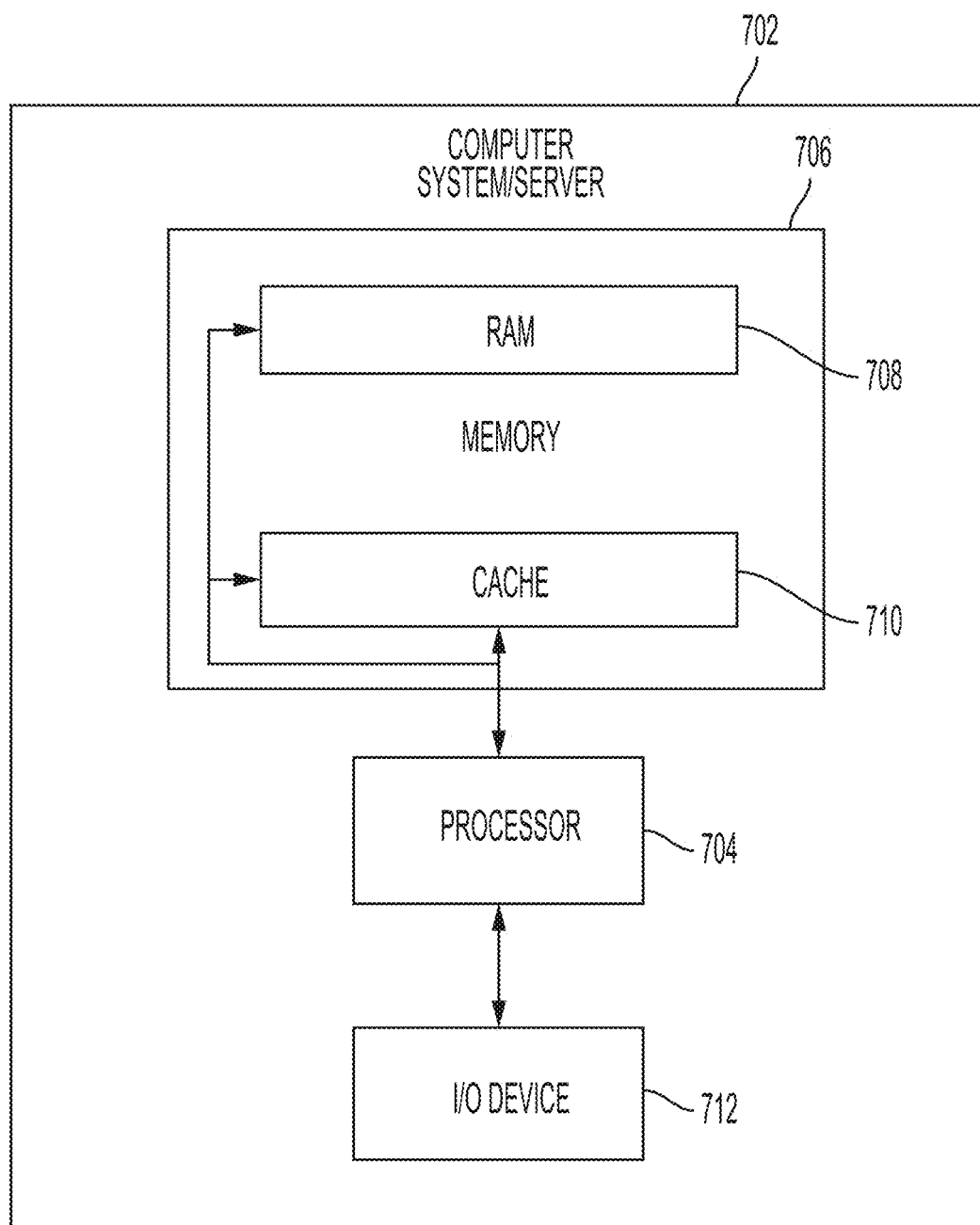
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying a dangerous driving situation;
    capturing first media by a vehicle involved in the dangerous driving situation;
    establishing a geofence based on a distance associated with the dangerous driving situation; and
    capturing second media by one or more other vehicles within the geofence;
    wherein the first media and the second media comprise one or more sounds associated with the dangerous driving situation and a direction for the one or more sounds;
    wherein a cause for the dangerous driving situation and one or more videos are identified based on the first and the second media;
    wherein the one or more sounds are synchronized with the one or more videos.

2. The method of claim 1, wherein the first and second media are captured by one or more devices associated with the vehicle, another vehicle, an occupant of the vehicle, or an occupant of the one or more other vehicles.

3. The method of claim 1, wherein each of the first and second media comprises one or more of an audio file, a video file, a text file, an image file, vehicle telemetry, environmental data, traffic data, and sensor data.

4. The method of claim 1, wherein the method further comprises:
    timestamping the first and second media with one or more of a start time and an end time for each of the one or more sounds within the first and second media, respectively; and
    identifying a sound source for each of the one or more sounds.

5. The method of claim 1, further comprising:
    transmitting one or more of the first and second captured media related to the dangerous driving situation to storage outside the geofence, wherein the storage outside the geofence comprises cloud storage.

6. A vehicle, comprising:
    a processor; and
    a memory, coupled to the processor, comprising instructions that when executed by the processor are configured to:
        identify a dangerous driving situation;
        capture first media by a vehicle involved in the dangerous driving situation;
        establish a geofence based on a distance associated with the dangerous driving situation; and
        receive second media from one or more other vehicles within the geofence;
        wherein the first media and the second media comprise one or more sounds associated with the dangerous driving situation and a direction for the one or more sounds;
        wherein a cause for the dangerous driving situation and one or more videos are identified based on the first and the second media;
        wherein the one or more sounds are synchronized with the one or more videos.

7. The vehicle of claim 6, wherein the first and second media are captured by one or more devices associated with the vehicle, another vehicle, an occupant of the vehicle, or an occupant of the one or more other vehicles.

8. The vehicle of claim 6, wherein each of the first and second media comprises one or more of an audio file, a video file, a text file, an image file, vehicle telemetry, environmental data, traffic data, and sensor data.

9. The vehicle of claim 6, wherein the server s further configured to:
    timestamp the first and second media with one or more of a start time and an end time for each of the one or more sounds within the first and second media, respectively; and
    identify a sound source for each of the one or more sounds.

10. The vehicle of claim 6, further configured to:
    transmit one or more of the first and second captured media related to the dangerous driving situation to storage outside the geofence, wherein the storage outside the geofence comprises cloud storage.

11. A non-transitory computer readable medium comprising instructions, that when read by a processor, cause the processor to perform:
    identifying a dangerous driving situation;
    capturing first media by a vehicle involved in the dangerous driving situation;
    establishing a geofence based on a distance associated with the dangerous driving situation; and
    capturing second media by one or more other vehicles within the geofence;
    wherein the first media and the second media comprise one or more sounds associated with the dangerous driving situation and a direction for each of the one or more sounds;
    wherein a cause for the dangerous driving situation and one or more videos are identified based on the first and the second media;
    wherein the one or more sounds are synchronized with the one or more videos.

12. The non-transitory computer readable medium of claim 11, wherein the first and second media are captured by one or more devices associated with the vehicle, another vehicle, an occupant of the vehicle, or an occupant of the one or more other vehicles.

13. The non-transitory computer readable medium of claim 11, wherein each of the first and second media comprises one or more of an audio file, a video file, a text file, an image file, vehicle telemetry, environmental data, traffic data, and sensor data.

14. The non-transitory computer readable medium of claim 11, wherein the processor further performs:
    timestamping the first and second media with one or more of a start time and an end time for each of the one or more sounds within the first and second media, respectively;

identifying a sound source for each of the one or more sounds; and transmitting one or more of the first and second captured media related to the dangerous driving situation to storage outside the geofence, wherein the storage outside the geofence comprises cloud storage.

\* \* \* \* \*